(12) United States Patent
Ma et al.

(10) Patent No.: US 12,244,013 B2
(45) Date of Patent: Mar. 4, 2025

(54) COMPOSITE CATHODE ACTIVE MATERIAL, METHOD OF PREPARING THE SAME, CATHODE INCLUDING THE SAME, AND SECONDARY BATTERY INCLUDING THE COMPOSITE CATHODE ACTIVE MATERIAL

(71) Applicant: Samsung Electronics Co., Ltd., Suwon-si (KR)

(72) Inventors: Sangbok Ma, Suwon-si (KR); Joonhee Kim, Seoul (KR); Jonghoon Ka, Suwon-si (KR); Sungjin Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 128 days.

(21) Appl. No.: 17/570,791

(22) Filed: Jan. 7, 2022

(65) Prior Publication Data
US 2023/0025348 A1 Jan. 26, 2023

(30) Foreign Application Priority Data
Jul. 19, 2021 (KR) .................... 10-2021-0094476

(51) Int. Cl.
*H01M 4/58* (2010.01)
*C01B 25/45* (2006.01)
(Continued)

(52) U.S. Cl.
CPC .......... *H01M 4/5825* (2013.01); *C01B 25/45* (2013.01); *H01M 4/0471* (2013.01);
(Continued)

(58) Field of Classification Search
CPC .. H01M 4/5825; H01M 4/0471; H01M 4/366; H01M 4/625; H01M 2004/028;
(Continued)

(56) References Cited

U.S. PATENT DOCUMENTS 7,642,014 B2    1/2010  Morishima et al.
7,914,932 B2 *  3/2011  Yoshida ............ H01M 10/0562
                                                429/231.95
(Continued)

FOREIGN PATENT DOCUMENTS

JP        2002358965 A    12/2002
JP          5141582 B2     2/2013
(Continued)

OTHER PUBLICATIONS

Wang et al., Cr-substituted LiCoPO4 core with a conductive carbon layer towards high-voltage lithium-ion batteries, 2018, J. Solid State Chemistry, 258, 32-41 (Year: 2018).*
(Continued)

*Primary Examiner* — Daniel S Gatewood
(74) *Attorney, Agent, or Firm* — CANTOR COLBURN LLP

(57) ABSTRACT

A composite cathode active material represented by $Li_x(Co_{1-w}M1_w)_yPO_4$ (Formula 1) having an olivine structure, wherein a unit-cell volume of the composite cathode active material is in a range of about 283 Å$^3$ to about 284.6 Å$^3$. A cathode including the composite cathode active material, and a secondary battery including the composite cathode active material are also disclosed.
In Formula 1, M1 includes i) at least one of Sc, Ti, V, Cr, Cu, or Zn, and optionally at least one of Fe or Ni, and $0.9 \leq x \leq 1.1$, $0.9 \leq y \leq 1.1$, and $0 < w \leq 0.3$.

14 Claims, 14 Drawing Sheets

(51) Int. Cl.
  *H01M 4/02* (2006.01)
  *H01M 4/04* (2006.01)
  *H01M 4/36* (2006.01)
  *H01M 4/62* (2006.01)

(52) U.S. Cl.
  CPC ............ *H01M 4/366* (2013.01); *H01M 4/625* (2013.01); *C01P 2002/50* (2013.01); *C01P 2002/72* (2013.01); *C01P 2002/77* (2013.01); *C01P 2006/40* (2013.01); *H01M 2004/028* (2013.01)

(58) Field of Classification Search
  CPC ........... H01M 10/052; H01M 10/0562; H01M 10/0585; H01M 2300/0068; C01B 25/45; C01P 2002/50; C01P 2002/72; C01P 2002/77; C01P 2006/40; Y02E 60/10
  See application file for complete search history.

(56) References Cited

U.S. PATENT DOCUMENTS

| | | | |
|---|---|---|---|
| 7,998,622 B2 | 8/2011 | Inda | |
| 8,778,542 B2 | 7/2014 | Iwaya et al. | |
| 9,034,524 B2 | 5/2015 | Moon et al. | |
| 9,159,989 B2 | 10/2015 | Ogasa | |
| 9,178,215 B2 | 11/2015 | Beck et al. | |
| 9,225,021 B2 | 12/2015 | Wakita et al. | |
| 9,368,828 B2 | 6/2016 | Ouchi et al. | |
| 9,419,308 B2 | 8/2016 | Sano | |
| 9,577,285 B2 | 2/2017 | Chu et al. | |
| 9,859,559 B2 | 1/2018 | Kim et al. | |
| 9,865,899 B2 | 1/2018 | Ito et al. | |
| 10,096,818 B2 | 10/2018 | Teraoka et al. | |
| 10,135,084 B2 | 11/2018 | Lee et al. | |
| 10,147,934 B2 | 12/2018 | Dumont et al. | |
| 10,601,073 B2 | 3/2020 | Yoshioka et al. | |
| 11,228,035 B2 | 1/2022 | Oshitari et al. | |
| 2011/0003212 A1 | 1/2011 | Sato et al. | |
| 2011/0269023 A1 | 11/2011 | Kawakami et al. | |
| 2012/0273716 A1* | 11/2012 | Li | H01M 4/58 252/182.1 |
| 2016/0204464 A1 | 7/2016 | Cho et al. | |
| 2019/0157670 A1 | 5/2019 | Wolter et al. | |
| 2020/0006758 A1* | 1/2020 | Wi | H01M 4/366 |
| 2020/0381775 A1 | 12/2020 | Fujii et al. | |
| 2021/0184248 A1 | 6/2021 | Ono | |
| 2021/0280869 A1 | 9/2021 | Nakano | |

FOREIGN PATENT DOCUMENTS

| | | |
|---|---|---|
| JP | 6290312 B2 | 3/2018 |
| JP | 6527972 B1 | 6/2019 |
| JP | 2020129503 A | 8/2020 |
| JP | 6841362 B1 | 3/2021 |
| KR | 1020200001230 A | 1/2020 |
| KR | 102135631 B1 | 7/2020 |
| KR | 1020220053459 A | 4/2022 |
| KR | 1020220064275 A | 5/2022 |
| KR | 1020220069620 A | 5/2022 |
| WO | 2011025823 A1 | 3/2011 |
| WO | 2018092434 A1 | 5/2018 |
| WO | 2019082477 A1 | 5/2019 |
| WO | 2019163448 A1 | 8/2019 |
| WO | 2020110666 A1 | 6/2020 |

OTHER PUBLICATIONS

Wang et al., Preparation and electrochemical performance of V-doped $LiCoPO_4$ cathode materials, 2011, Gongneng Cailiao, 42, 679-681 (Year: 2011).*

Kreder et al., Aliovalent Substitution of $V^{3+}$ for $Co^{2+}$ in $LiCoPO_4$ by a Low-Temperature Microwave-Assisted Solvothermal Process, 2016, Chem. Mater., 28, 1847-1853 (Year: 2016).*

* cited by examiner

COMPOSITE CATHODE ACTIVE MATERIAL, METHOD OF PREPARING THE SAME, CATHODE INCLUDING THE SAME, AND SECONDARY BATTERY INCLUDING THE COMPOSITE CATHODE ACTIVE MATERIAL

CROSS-REFERENCE TO RELATED APPLICATION

This application claims priority to Korean Patent Application No. 10-2021-0094476, filed on Jul. 19, 2021, in the Korean Intellectual Property Office, and the benefits accruing therefrom under 35 U.S.C. § 119, the content of which is incorporated by reference herein in its entirety.

BACKGROUND

1. Field

The present disclosure relates to a composite cathode active material, a method of preparing the composite cathode active material, a cathode including the composite cathode active material, and a secondary battery including the composite cathode active material.

2. Description of the Related Art

Since lithium secondary batteries use an electrolytic solution including a flammable organic solvent, there is a possibility of overheating or fire when a short-circuit occurs. In an all-solid secondary battery, a flammable organic solvent is not used, thus the possibility of a fire may be reduced even when a short-circuit occurs.

In this regard, an all-solid secondary battery using a solid electrolyte instead of an electrolytic solution has been proposed. Such an all-solid secondary battery may have greatly increased safety, compared to a lithium-ion battery using an electrolyte solution.

Since an all-solid secondary battery may be charged over the voltage limit of an electrolyte solution, a high-voltage cathode material may be used in the battery to increase the energy density of the battery.

An all-solid battery including a metal oxide as an anode material has a low battery driving voltage as compared to a battery including a carbonaceous anode material, thus a high-voltage cathode material is desirable to be used in the all-solid battery.

A phosphate cathode material having an olivine structure has a low voltage of about 3 V, and also has a low electron conductivity. Accordingly, there is a need to develop an improved cathode material.

SUMMARY

Provided is a novel cathode active material having excellent high-voltage characteristics and a low charge/discharge overvoltage.

Provided is a cathode including the cathode active material.

Provided is a secondary battery including the cathode.

Provided is a method of preparing the cathode active material.

Additional aspects will be set forth in part in the description which follows and, in part, will be apparent from the description, or may be learned by practice of the presented embodiments of the disclosure.

According to an aspect of an embodiment, a composite cathode active material is represented by Formula 1 and has an olivine structure, wherein a unit-cell volume of the composite cathode active material is in a range of about 283 Å$^3$ to about 284.6 Å$^3$.

   Formula 1

In Formula 1, M1 includes at least one of Sc, Ti, V, Cr, Cu, or Zn, and optionally at least one of Fe or Ni, and $0.6 \leq x \leq 1.1$, $0.9 \leq y \leq 1.1$, and $0 < w \leq 0.3$.

According to an aspect of another embodiment, a cathode includes a cathode current collector; and a cathode active material layer on a surface of the cathode current collector, the cathode active material layer comprising the composite cathode active material.

According to an aspect of another embodiment, a secondary battery includes a cathode; an anode; and an electrolyte disposed between the cathode and the anode, wherein the cathode includes the composite cathode active material.

According to an aspect of another embodiment, a method of preparing a composite cathode active material includes mixing a M1 precursor, a lithium precursor, a cobalt precursor, and a phosphorus precursor to prepare a precursor mixture; and heat-treating the precursor mixture to form a composite cathode active material represented by Formula 1 and having an olivine structure, wherein a unit-cell volume of the composite cathode active material is in a range of about 283 Å$^3$ to about 284.6 Å$^3$:

   Formula 1 wherein, in Formula 1, M1 includes at least one of Sc, Ti, V, Cr, Cu, or Zn, and optionally at least one of Fe or Ni, and $0.6 \leq x \leq 1.1$, $0.9 \leq y \leq 1.1$, and $0 < w \leq 0.3$, and wherein M1 of the M1 precursor includes at least one of Sc, Ti, V, Cr, Cu, or Zn, and optionally at least one of Fe or Ni.

The heat-treating the precursor mixture can include heat-treating in an oxidizing atmosphere or an inert atmosphere at a temperature in a range of about 600° C. to about 900° C.

A method of manufacturing a battery includes providing a cathode layer, a solid electrolyte, and an anode layer; and disposing the solid electrolyte layer between the cathode layer and the cathode layer thus manufacturing the battery, wherein the cathode layer includes the composite cathode active material.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
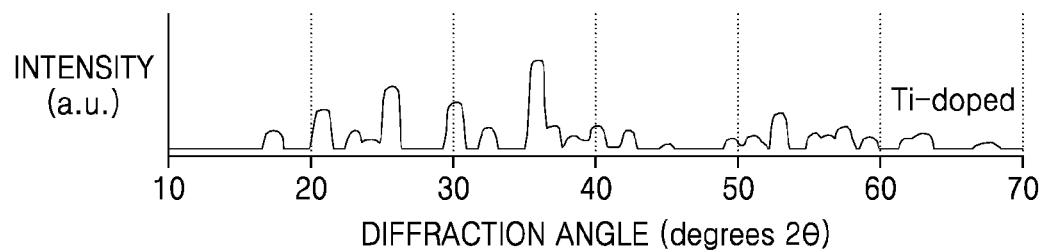
FIG. 1A is a graph of intensity (arbitrary units, a.u.) versus diffraction angle (degrees 2θ) showing results of X-ray diffraction analysis of a composite cathode active material of Preparation Example 1.
Figure 1B:
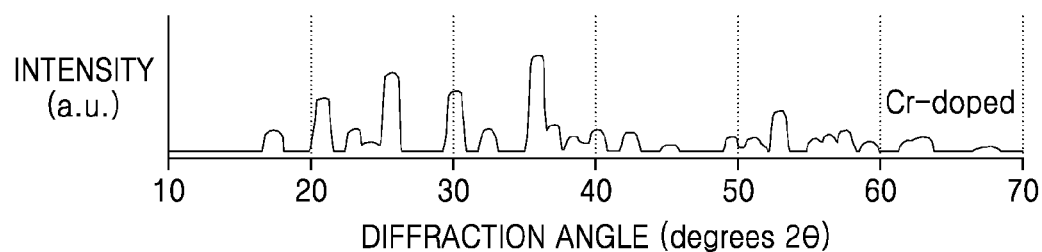
FIG. 1B is a graph of intensity (arbitrary units, a.u.) versus diffraction angle (degrees 2θ) showing results of X-ray diffraction analysis of a composite cathode active material of Preparation Example 2.
Figure 1C:
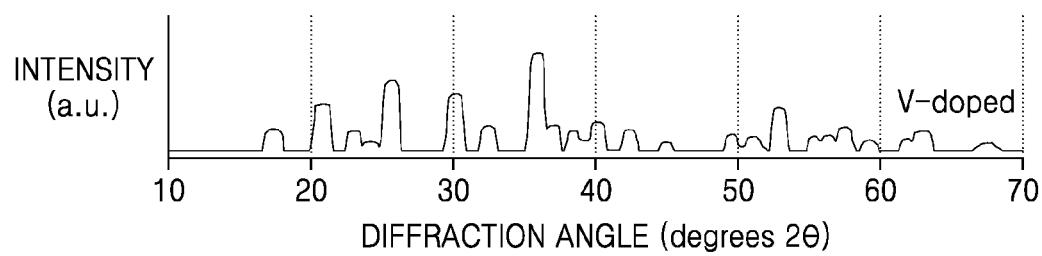
FIG. 1C is a graph of intensity (arbitrary units, a.u.) versus diffraction angle (degrees 2θ) showing results of X-ray diffraction analysis of a composite cathode active material of Preparation Example 3.
Figure 1D:
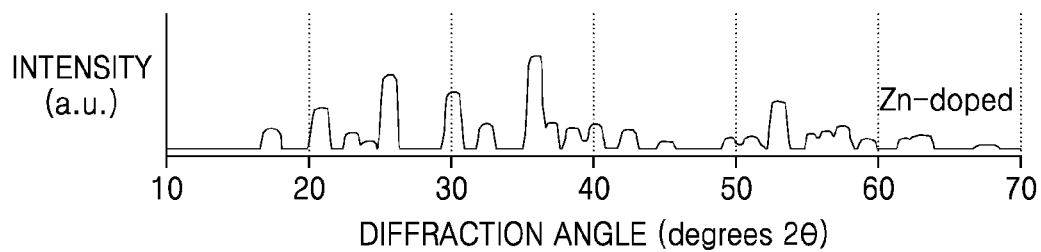
FIG. 1D is a graph of intensity (arbitrary units, a.u.) versus diffraction angle (degrees 2θ) showing results of X-ray diffraction analysis of a composite cathode active material of Preparation Example 4.
Figure 1E:
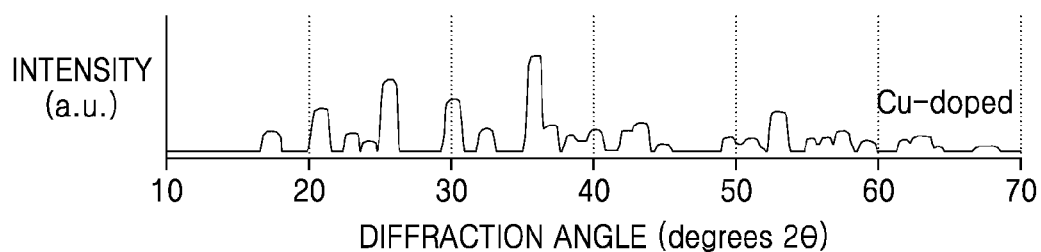
FIG. 1E is a graph of intensity (arbitrary units, a.u.) versus diffraction angle (degrees 2θ) showing results of X-ray diffraction analysis of a composite cathode active material of Preparation Example 5.
Figure 1F:
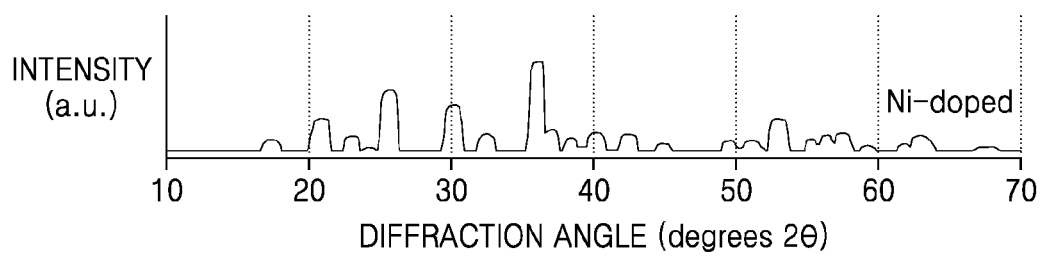
FIG. 1F is a graph of intensity (arbitrary units, a.u.) versus diffraction angle (degrees 2θ) showing results of X-ray diffraction analysis of a composite cathode active material of Preparation Example 6.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

"Olivine" or "olivine structure" as used herein means that the compound has a crystal structure that in isostructural with olivine, $(Mg_xFe_{1-x})_2SiO_4$, wherein $0 \le x \le 1$.

Hereinafter, a composite cathode active material according to an embodiment, a method of preparing the same, a cathode including the composite cathode active material, and a secondary battery including the composite cathode active material will be described in further detail.

A phosphate-based compound having an olivine structure, e.g., $LiCoPO_4$ theoretically has a high voltage and a high discharge capacity of 100 milliampere-hours per gram (mAh/g), or more. However, since $LiCoPO_4$ has insufficient structural stability, a discharge capacity practically obtained in a lithium battery is less than 50 mAh/g, and the voltage, high rate, and lifespan characteristics of the battery are not satisfactory.

According to an embodiment, a composite cathode active material is provided to resolve these problems.

In the composite cathode active material according to an embodiment, a 3d transition metal dopant is introduced into $LiCoPO_4$ to induce changes in electronic and ionic structures and to improve the electrochemical properties of the composite cathode active material. The composite cathode active material is represented by Formula 1 and has an olivine structure, wherein a unit-cell volume of the composite cathode active material is in a range of about 283 cubic angstrom ($Å^3$) to about 284.6 $Å^3$.

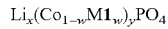

Formula 1

In Formula 1, M1 includes at least one of Sc, Ti, V, Cr, Cu, or Zn, and optionally at least one of Fe or Ni, and $0.6 \le x \le 1.1$, $0.9 \le y \le 1.1$, and $0 < w \le 0.3$.

While not wanting to be bound by theory, it is understood that when the unit-cell volume of the composite cathode active material is less than about 283 $Å^3$, the small lattice volume of the composite cathode active material may impede migration of lithium ions and realization of the full capacity of the cathode active material may be difficult, and when the unit-cell volume of the composite cathode active material is greater than 284.6 $Å^3$, the lattice volume of the composite cathode active material may be so large that an inductive effect by $PO_4$ is reduced, which results in a low voltage of the composite cathode active material.

In Formula 1, y can be 1. Also, $0.9 \le x \le 1.1$, $0 < w \le 0.2$, $0.5 < w \le 1.5$, or $0.8 < w \le 1.2$.

In the composite cathode active material according to an embodiment, a band gap may be reduced, and an improved inductive effect may be obtained by introducing a 3d transition metal dopant to $LiCoPO_4$. Also, when a transition metal dopant such as vanadium or iron is included, the composite cathode active material has a positive (+) antisite defect formation energy (ADFE), which results in excellent suppression of antisite mixing. As a result, the composite cathode active material may have an improved charge/discharge average voltage and a discharge capacity, and lifespan characteristics of a secondary battery including a cathode including the composite cathode active material may be improved. As used herein, the ADFE may be evaluated using a quantum computing method.

As used herein, a unit-cell volume varies according to a composition and a crystal structure of a composite cathode active material, and this characteristic may be evaluated using a Rietveld refinement method of X-ray diffraction analysis. A unit lattice may be determined from transmission electron diffraction experiments and refined against the X-ray diffraction data.

Rietveld refinement is a method of extracting information of a unit cell from X-ray diffraction such as a unit-cell volume, and the method is described in the reference document (ISBN: 9783110461381 (doi.org/10.1515/9783110461381), Modern Diffraction Methods, ISBN: 9783527322794 (D01:10.1002/9783527649884)) in detail, the content of which is incorporated herein by reference in its entirety.

The unit-cell volume may be, for example, in a range of about 283.1 $Å^3$ to about 284.5 $Å^3$, about 283.3 $Å^3$ to about 284.5 $Å^3$, about 283.5 $Å^3$ to about 284.4 $Å^3$, about 283.7 $Å^3$ to about 284.3 $Å^3$, about 283.9 $Å^3$ to about 284.3 $Å^3$, or about 284 $Å^3$ to about 284.2 $Å^3$.

A unit-cell represents the smallest repeating unit of a crystal structure, and when a volume of a unit-cell is reduced, an inductive effect by $PO_4$ increases, which results in an increase in an average voltage during charging and discharging and an increase in an energy density.

A unit-cell of $LiCoPO_4$ may include four Li atoms, four P atoms, four Co atoms, and sixteen oxygen atoms. However, the composite cathode active material according to an embodiment has a structure in which M1 substitutes for some of Co and resides on some of Co sites in the unit-cell of $LiCoPO_4$.

A dopant of the composite cathode active material may improve structural stability of an olivine crystal phase, and lifespan characteristics of a lithium secondary battery including the composite cathode active material may be improved. Also, since the composite cathode active material maintains a high voltage, an energy density of a lithium secondary battery including the composite cathode active material may be improved.

An average discharge voltage of the composite cathode active material according to an embodiment may be, for example, about 4.4 V or more, about 4.6 V or more, or in a range of about 4.4 V to about 5.6 V, about 4.4 V to about 5.2 V, about 4.6 V to about 5.2 V or about 4.7 V to about 4.9 V, versus Li/Li+. Since the composite cathode active material has such a high average discharge voltage, an energy density of a secondary battery including the composite cathode active material may be improved. An average discharge voltage may be, for example, a voltage obtained by dividing an integrated value of a profile area in a discharge profile graph of a discharge voltage and a specific capacity with a discharge capacity. Alternatively, an average discharge voltage may be, for example, a voltage of a maximum of dQ/dV in a graph of differential capacity (dQ/dV) of charges (Q) versus voltage (V).

The composite cathode active material according to an embodiment may be, for example, a compound represented by Formula 1-1.

$$Li_x(Co_{1-w1-w2}M1_{w1}M2_{w2})_yPO_4 \quad \text{Formula 1-1}$$

In Formula 1-1, M1 is at least one of Sc, Ti, V, Cr, Cu, or Zn, M2 includes at least one of Fe or Ni, and $0.6 \leq x \leq 1.1$, $0 < w1 \leq 0.1$, and $0 < w2 \leq 0.1$.

In Formula 1-1, y can be 1, and $0 < w1 \leq 0.05$ and $0 < w2 \leq 0.05$.

The composite cathode active material may be, for example, is at least one of compounds represented by any of Formulae 2 to 11.

$$Li_x(Co_{1-w}Zn_w)_yPO_4 \quad \text{Formula 2}$$

wherein in Formula 2, $0.6 \leq x \leq 1.1$, $0.9 \leq y \leq 1.1$, and $0 < w \leq 0.3$.

$$Li_x(Co_{1-w}V_w)_yPO_4 \quad \text{Formula 3}$$

wherein in Formula 3, $0.6 \leq x \leq 1.1$, $0.9 \leq y \leq 1.1$, and $0 < w \leq 0.3$.

$$Li_x(Co_{1-w}Ti_w)_yPO_4 \quad \text{Formula 4}$$

wherein in Formula 4, $0.6 \leq x \leq 1.1$, $0.9 \leq y \leq 1.1$, and $0 < w \leq 0.3$.

$$Li_x(Co_{1-w}Cu_w)_yPO_4 \quad \text{Formula 5}$$

wherein in Formula 5, $0.6 \leq x \leq 1.1$, $0.9 \leq y \leq 1.1$, and $0 < w \leq 0.3$.

$$Li_x(Co_{1-w}Cr_w)_yPO_4 \quad \text{Formula 6}$$

wherein in Formula 6, $0.6 \leq x \leq 1.1$, $0.9 \leq 1.1$, and $0 < w \leq 0.3$.

$$Li_x(Co_{1-w}Cr_w)_yPO_4 \quad \text{Formula 7}$$

wherein in Formula 7, $0.6 \leq x \leq 1.1$, $0.9 \leq 1.1$, and $0 < w \leq 0.3$.

$$Li_x(Co_{1-w1-w2}Zn_{w1}M1_{w2}M1_{w2})_yPO_4 \quad \text{Formula 8}$$

wherein in Formula 8, $0.6 \leq x \leq 1.1$, $0.9 \leq y \leq 1.1$, $0 < w1 \leq 0.1$, and $0 < w2 < 0.1$, and M1 is at least one of Ni, Fe, V, or Ti.

$$Li_x(Co_{1-w1-w2}Ni_{w1}M1_{w2})_yPO_4 \quad \text{Formula 9}$$

wherein in Formula 9, $0.6 \leq x \leq 1.1$, $0.9 \leq y \leq 1.1$, $0 < w1 \leq 0.1$, and $0 < w2 \leq 0.1$, and M1 is at least one of Fe, V, or Ti.

$$Li_x(Co_{1-w1-w2}V_{w1}M1_{w2})_yPO_4 \quad \text{Formula 10}$$

wherein in Formula 10, $0.6 \leq x \leq 1.1$, $0.9 \leq y \leq 1.1$, $0 < w1 \leq 1$, and $0 < w2 \leq 0.1$, and M1 is at least one of Fe or Ti.

$$Li_x(Co_{1-w1-w2}Ti_{w1}M1_{w2})_yPO_4 \quad \text{Formula 11}$$

wherein in Formula 11, $0.6 \leq x \leq 1.1$, $0.9 \leq y \leq 1.1$, $0 < w1 \leq 0.1$, and $0 < w2 \leq 0.1$, and M1 is Fe.

In Formulae 2 to 11, $0 < w \leq 0.2$, $0 < w \leq 0.1$, or $0 < w \leq 0.05$.

In Formulae 2 to 11, $0.9 \leq x \leq 1.1$.

The composite cathode active material according to an embodiment may be at least one of $LiCo_{1-w}Zn_wPO_4$ (where $0 < w \leq 0.3$), $LiCo_{1-w}V_wPO_4$ (where $0 < w \leq 0.3$), $LiCo_{1-w}Ti_wPO_4$ (where $0 < w \leq 0.3$), $LiCo_{1-w}Cu_wPO_4$ (wherein $0 < w \leq 0.3$), $LiCo_{1-w}Cr_wPO_4$ (where $0 < w \leq 0.3$), $LiCo_{1-w}Cr_wPO_4$ (where $0 < w1 \leq 0.1$ and $0 < w2 \leq 0.1$), $LiCo_{1-w1-w2}V_{w1}M1_{w2}PO_4$ (where $0 < w1 \leq 0.1$ and $0 < w2 \leq 0.1$), or $LiCo_{1-w1-w2}Ti_{w1}M1_{w2}PO_4$ (where $0 < w1 \leq 0.1$ and $0 < w2 \leq 0.1$).

The composite cathode active material may be, for example, $LiCo_{1-w1-w2}Zn_{w1}Ni_{w2}PO_4$ (where $0 < w1 \leq 0.1$ and $0 < w2 \leq 0.1$), $LiCo_{1-w1-z2}Zn_{w1}Fe_{w2}PO_4$ (where $0 < w1 \leq 0.1$ and $0 < w2 \leq 0.1$), $LiCo_{1-w1-w2}Zn_{w1}V_{w2}PO_4$ (where $0 < w1 \leq 0.1$ and $0 < w2 \leq 0.1$), $LiCo_{1-w1-w2}Ni_{w1}V_{w2}PO_4$ (where $0 < w1 \leq 0.1$ and $0 < w2 \leq 0.1$), $LiCo_{1-w1-w2}Ti_{w1}Zn_{w2}PO_4$ (where $0 < w1 \leq 0.1$ and $0 < w2 \leq 0.1$), $LiCo_{1-w1-w2}Ni_{w1}Fe_{w2}PO_4$ (where $0 < w1 \leq 0.1$ and $0 < w2 \leq 0.1$), $LiCo_{1-w1-w2}V_{w1}Fe_{w2}PO_4$ (where $0 < w1 \leq 0.1$ and $0 < w2 \leq 0.1$), $LiCo_{1-w1-w2}T_{w1}Fe_{w2}PO_4$ (where $0 < w1 \leq 0.1$ and $0 < w2 \leq 0.1$), or $LiCo_{1-w1-w2}Ti_wV_aPO_4$ (where $0 < w1 \leq 0.1$ and $0 < w2 \leq 0.1$).

The composite cathode active material may be, for example, $LiCo_{0.9}Ti_{0.1}PO_4$, $LiCo_{0.8}Ti_{0.2}PO_4$, $LiCo_{0.7}Ti_{0.3}PO_4$, $LiCo_{0.9}Cr_{0.1}PO_4$, $LiCo_{0.8}Cr_{0.2}PO_4$, $LiCo_{0.7}Cr_{0.3}PO_4$, $LiCo_{0.9}V_{0.1}PO_4$, $LiCo_{0.8}V_{0.2}PO_4$, $LiCo_{0.7}V_{0.3}PO_4$, $Li_{0.9}Zn_{0.1}PO_4$, $LiCo_{0.8}Zn_{0.2}PO_4$, $LiCo_{0.7}Zn_{0.3}PO_4$, $LiCo_{0.9}Cu_{0.1}PO_4$, $LiCo_{0.8}Cu_{0.2}PO_4$, $LiCo_{0.7}Cu_{0.3}PO_4$, $LiCo_{0.9}Sc_{0.1}PO_4$, $LiCo_{0.8}Sc_{0.2}PO_4$, $LiCo_{0.7}Sc_{0.3}PO_4$, $LiCo_{0.9}Zn_{0.05}Ni_{0.05}PO_4$, $LiCo_{0.8}Zn_{0.1}Ni_{0.1}PO_4$, $LiCo_{0.7}Zn_{0.15}Ni_{0.15}PO_4$, $LiCo_{0.9}Zn_{0.05}Fe_{0.05}PO_4$, $LiCo_{0.8}Zn_{0.1}Fe_{0.1}PO_4$, $LiCo_{0.7}Zn_{0.15}Fe_{0.15}PO_4$, $LiCo_{0.9}Zn_{0.05}V_{0.05}PO_4$, $LiCo_{0.8}Zn_{0.1}V_{0.1}PO_4$, $LiCo_{0.9}Zn_{0.15}V_{0.15}PO_4$, $LiCo_{0.9}Ni_{0.05}V_{0.05}PO_4$, $LiCo_{0.8}Ni_{0.1}V_{0.1}PO_4$, $LiCo_{0.7}Ni_{0.15}V_{0.15}PO_4$, $LiCo_{0.9}Ti_{0.05}Zn_{0.05}PO_4$, $LiCo_{0.8}Ti_{0.1}Zn_{0.1}PO_4$, $LiCo_{0.7}Ti_{0.15}Zn_{0.15}PO_4$, $LiCo_{0.8}V_{0.1}Fe_{0.1}PO_4$, $LiCo_{0.7}V_{0.15}Fe_{0.15}PO_4$, $LiCo_{0.7}Ni_{0.15}Fe_{0.15}PO_4$, $LiCo_{0.9}V_{0.05}Fe_{0.05}PO_4$, $LiCo_{0.8}V_{0.1}Fe_{0.1}PO_4$, $LiCo_{0.7}V_{0.15}Fe_{0.15}PO_4$, $LiCo_{0.9}Ti_{0.05}Fe_{0.05}PO_4$, $LiCo_{0.8}Ti_{0.1}Fe_{0.1}PO_4$, $LiCo_{0.7}Ti_{0.15}Fe_{0.15}PO_4$, $LiCo_{0.9}Ti_{0.05}V_{0.05}PO_4$, $LiCo_{0.8}Ti_{0.1}V_{0.1}PO_4$, or $LiCo_{0.7}Ti_{0.15}V_{0.15}PO_4$.

A band gap of the composite cathode active material according to an embodiment may be in a range of about 0.01 eV to about 2.2 eV, about 0.1 eV to about 2.0 eV, about 0.5 eV to about 2.0 eV, about 0.5 eV to about 1.5 eV, or about 0.6 eV to about 1.2 eV, and an antisite defect formation energy (ADFE) of the composite cathode active material according to an embodiment may be in a range of about −20 eV to about 3 eV, about −15 eV to about 3 eV, about −12 to about 2 eV, or about −10 eV to about 1 eV.

The composite cathode active material has a crystal structure that belongs to an orthorhombic crystal system and a Pnma space group. Also, a specific capacity of the composite cathode active material at room temperature (25° C.) may be, for example, about 50 mAh/g or greater, or in a range of about 50 mAh/g to about 170 mAh/g, about 50 mAh/g to about 150 mAh/g, about 50 mAh/g to about 130 mAh/g, or about 50 mAh/g to about 100 mAh/g. When the composite cathode active material has such high specific capacity within these ranges, an energy density of the secondary battery may be improved. The specific capacity may be, for example, an initial discharge capacity.

The composite cathode active material according to an embodiment may have a carbonaceous coating on a surface thereof. When a carbonaceous coating is on a surface of the composite cathode active material, an electronic conductivity of the composite cathode active material may be improved. An amount of a carbonaceous material in the carbonaceous coating may be in a range of about 0.01 parts to about 15 parts by weight, about 0.1 parts to about 10 parts by weight, about 0.1 parts to about 5 parts by weight, or about 0.5 parts to about 3 parts by weight based on 100 parts by weight of the total weight of the composite cathode active material. Examples of a carbon source for forming the carbonaceous coating may include at least one of sucrose, pitch, or graphite. The carbonaceous coating may be in the form of a continuous or discontinuous film.

According to another embodiment, a cathode includes the composite cathode active material.

The cathode may include, for example, a cathode current collector; and a cathode active material layer disposed on one surface or two surfaces of the cathode current collector. The cathode active material layer includes the composite cathode active material. According to a method of preparing the cathode, the cathode current collector may be omitted.

An amount of the composite cathode active material in the cathode active material layer may be, for example, in a range of about 30 weight % (wt %) to about 100 wt %, about 50 wt % to about 100 wt %, or about 50 wt % to about 90 wt % based on the total weight of the cathode active material layer.

The cathode active material layer may further include or may not include a conducting agent, an additive to improve electronic or ionic conductivity, a binder, or a combination thereof.

An amount of the conducting agent in the cathode active material layer may be, for example, in a range of 0 wt % or about 0.1 wt % to about 40 wt %, about 0.1 wt % to about 30 wt %, about 1 wt % to about 20 wt %, or about 1 wt % to about 10 wt % based on the total weight of the cathode active material layer.

An amount of the binder in the cathode active material layer may be in a range of 0 wt % or about 0.1 wt % to about 30 wt %, about 0.1 wt % to about 20 wt %, or about 1 wt % to about 10 wt % based on the total weight of the cathode active material layer.

Types of the conducting agent and the binder in the cathode active material layer are not particularly limited, and any suitable conducting agent and any suitable binder may be used.

The cathode may provide a high average discharge voltage by including the composite cathode active material.

According to another embodiment, a secondary battery includes a cathode; an anode; and an electrolyte disposed between the cathode and the anode, wherein the cathode includes the composite cathode active material according to an embodiment.

A secondary battery may be, for example, a lithium secondary battery or an all-solid battery. A secondary battery may be, for example, a multi-layer-ceramic (MLC) battery or a thin film battery.

A MLC battery may include, for example, a plurality of cathode layers; a plurality of anode layers alternately disposed between the plurality of cathode layers; and a plurality of solid electrolyte layers alternately disposed between and separating cathode layers and anode layers of the plurality of cathode layers and the plurality of anode layers. At least one of the plurality of the cathode layers can comprise the composite cathode active material.

The solid electrolyte in a MLC battery can include a solid electrolyte, for example, an oxide-based solid electrolyte. In an embodiment, at least one of the plurality of the solid electrolyte layers includes the oxide-based solid electrolyte.

An anode in a MLC battery may include, for example, at least one anode active material of a lithium metal phosphate, a lithium metal oxide, or a metal oxide.

A MLC battery may be, for example, a sintered product of a stack in which a cathode active material precursor, an anode active material precursor, and a solid electrolyte precursor are sequentially laminated or a sintered product of a stack in which a cathode active material, an anode active material, and a solid electrolyte are sequentially laminated.

A MLC battery may have, for example, a stack structure in which a plurality of unit cells, each including a cathode layer including a cathode active material layer; a solid electrolyte layer, and an anode layer including an anode active material layer that are sequentially stacked, are continuously disposed such that the cathode active material layer and the anode active material layer face each other. A MLC battery may further include, for example, a cathode current collector and/or an anode current collector. When a MLC battery includes a cathode current collector, a cathode active material layer may be disposed on one or two surfaces of the cathode current collector. When a MLC battery includes an anode current collector, an anode active material layer may be disposed on one or two surfaces of the anode current collector. As a MLC battery further includes a cathode current collector and/or an anode current collector, high-rate characteristics of the battery may further be improved.

In a MLC battery, a current collector layer may be on any one of or both of an uppermost layer and a lowermost layer of a stack or a metal layer may be disposed on the stack to laminate a unit cell.

A MLC battery or a thin film battery may be, for example, a small-sized battery or an ultra small-sized battery that may be used as an internet of things (IoT) oriented application power or a wearable device power.

A MLC battery or a thin film battery may be used as a medium-to-large battery of electric vehicles (EVs) and energy storage systems (ESSs).

A secondary battery may be, for example, a MLC solid battery including at least a first single cell, a second single cell, and an internal current collector layer, wherein each of the first single cell and the second single cell includes a cathode layer, a solid electrolyte layer, and an anode layer that are sequentially stacked, and the internal current collector layer is disposed between the first single cell and the second single cell such that the internal current collector layer is in contact with the cathode layers of the first single cell and the second single cell or in contact with the anode layers of the first single cell and the second single cell.

The anode active material of the anode active material layer may be, for example, at least a compound of $Li_{4/3}Ti_{5/3}O_4$, $LiTiO_2$, $LiM1_sM2_tO_u$, (where M1 and M2 are transition metals, and s, t, and u are optional positive numbers), $TiO_x$ (where $0<x\leq3$), $Li_xV_2(PO_4)_3$ (where $0<x\leq5$), or carbon (including graphite). The anode active material may be, for example, $Li_{4/3}Ti_{5/3}O_4$ or $LiTiO_2$.

The current collector layer may be formed of any suitable material for a cathode current collector and an anode current collector. The current collector layer may be, for example, formed of at least a metal of Ni, Cu, Ag, Pd, Au, or Pt. The current collector layer may be, for example, formed of an alloy including any of Ni, Cu, Ag, Pd, Au, or Pt. The alloy may be, for example, an alloy of at least two of Ni, Cu, Ag, Pd, Au, or Pt. The alloy may be, for example, an Ag/Pd alloy. The metal and alloy may be used alone or as a mixture of at least two selected from these. A material forming the current collector layer as a cathode current collector and a material forming the current collector layer as an anode current collector may be identical or different from each other. Since a melting point of an alloy or a mixed powder including Ag and Pd may be continuously and optionally changed from a melting point of silver (962° C.) to a melting point of palladium (1550° C.) according to a mixing ratio, a melting point may be adjusted depending on a co-firing temperature, and an increase in an internal resistance of a battery may be suppressed due to the high electron conductivity.

The solid electrolyte or the solid electrolyte layer may include an ion conductive inorganic material, and, for example, an oxide-based solid electrolyte may be used.

The oxide-based solid electrolyte may be at least one of $Li_{1+x+y}Al_xTi_{2-x}Si_{3-y}O_{12}$ (where $0<x<2$ and $0\leq y<3$), $BaTiO_3$, $Pb(Zr_xTi_{1-x})O_3$ (PZT) ($0\leq x\leq 1$), $Pb_{1-x}La_xZr_{1-y}Ti_yO_3$ (PLZT, where $0 \leq x<1$ and $0 \leq y<1$), $Pb(Mg_{1/3}Nb_{2/3})O_3$-$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y2O3$, $Al2O3$, $TiO_2$, $SiO_2$, $SiC$, lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $Li_{1+x+y}(AlaGa_{1-a})_x(Ti_bGe_{1-b})_{2-x}Si_yP_{3-y}O_{12}$ (where $0 \leq x \leq 1$, $0 \leq y \leq 1$, $0 \leq a \leq 1$, and $0 \leq g \leq 1$), lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$), lithium nitride-based glass ($Li_xN_y$, where $0<x<4$ and $0<y<2$), SiS2 ($Li_xSi_yS_z$, where $0<x<3, 0<y<2$, and $0<z<4$), $P_2S_5$-based glass ($Li_xP_yS_z$, where $0<x<3$, $0<y<3$, and $0<z<7$), $Li_2O$, $LiF$, $LiOH$, $Li_2CO_3$, $LiAlO_2$, $Li_2O$—$Al_2O_3$—$SiO_2$-$P_2O_5$—$TiO_2$—$GeO_2$-based ceramic, garnet-based ceramics, or $Li_{3+x}La_3M_2O_{12}$ (where M is at least one of Te, Nb, or Zr, and x is an integer of 1 to 10).

The solid electrolyte may be, for example, at least a lithium compound of $Li_{3.25}Al_{0.25}SiO_4$, $Li_3PO_4$, or $LiP_xSi_yO_z$ (where x, y, and z are independently optional positive numbers). The solid electrolyte may be, for example, $Li_{3.5}P_{0.5}Si_{0.5}O_4$.

Figure 6:
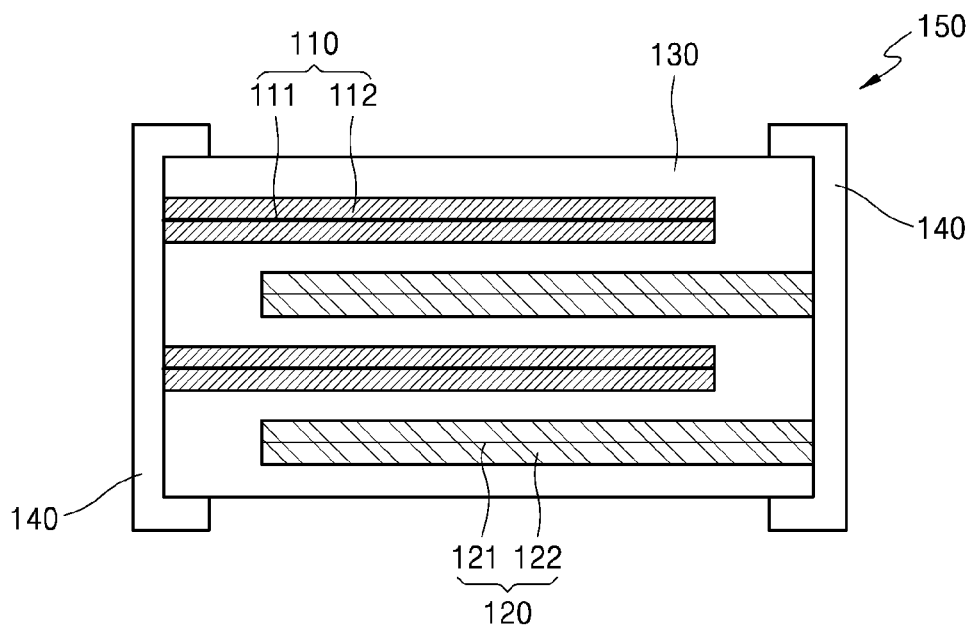
FIG. 6 is a schematic view of an embodiment of a structure of a multi-layered-ceramic (MLC) battery.

FIG. 6 is a schematic view of an embodiment of a cross-sectional structure of a MLC solid battery.

Referring to FIG. 6, the MLC battery may be prepared by sequentially stacking an oxide electrode and a solid electrolyte and simultaneously heat-treating the oxide electrode and the solid electrolyte. The heat treatment may be at 200° C. to 1200° C., 400° C. to 1000° C., or 500° C. to 900° C.

Referring to FIG. 6, a cathode active material layer 112 including a cathode active material according to an embodiment is disposed on one or both surfaces of a cathode current collector 111 to form a cathode 110. An anode active material layer 122 is disposed on one or both surfaces of an anode current collector 121 to form an anode 120. A solid electrolyte 130 is positioned between the cathode 110 and the anode 120. An external electrode 140 is formed at both ends of a battery body 150. The external electrode 140 connects to terminals of the cathode 110 and the anode 120 that are exposed to the outside of the battery body 150 and serves as an external terminal electrically connecting the cathode 110 and the anode 120 with an external device. One of a pair of the external electrodes 140 is connected to an end of the cathode 110 exposed to the outside of the battery body 150, and the other is connected to an opposite end of the anode 120 exposed to the outside of the battery body 150.

Figure 7:
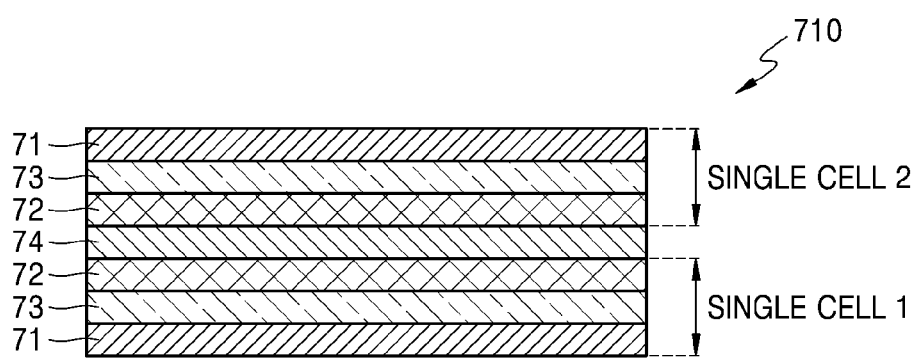
FIGS. 7 and 8 are schematic views of another embodiment of a structure of a secondary battery.
Figure 8:
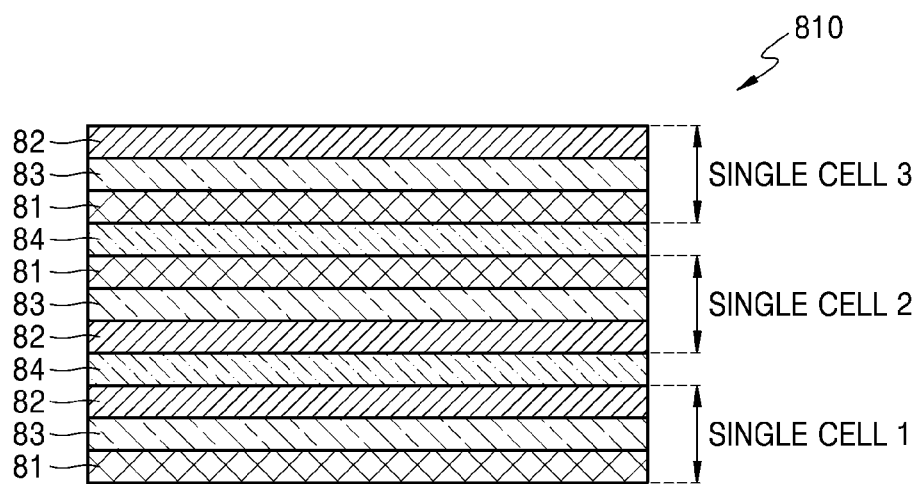

FIGS. 7 and 8 each show a schematic view of another embodiment of a MLC solid battery.

As shown in FIG. 7, Single Cell 1 and Single Cell 2 in a MLC solid battery 710 are laminated on both sides of an internal current collector layer 74. Each of Single Cell 1 and Single Cell 2 includes a cathode layer 71, a solid electrolyte layer 73, and an anode layer 72 that are sequentially stacked.

The cathode layer 71 includes a composite cathode active material according to an embodiment.

Single Cell 1, Single Cell 2, and the internal current collector layer 74 are stacked such that the anode layer 72 of Single Cell 2 is adjacent to one surface (an upper surface in FIG. 7) of the internal current collector layer 74 and the anode layer 72 of Single Cell 1 is adjacent to another side (a lower surface in FIG. 7) of the internal current collector layer 74.

Although the internal current collector layer 74 is shown as arranged in contact with both the anode layers 72 of Single Cell 1 and Single Cell 2 in FIG. 7, the internal current collector layer 74 may be arranged in contact with both the cathode layers 71 of Single Cell 1 and Single Cell 2. The internal current collector layer 74 includes an electron conductive material.

The internal current collector layer 74 may further include an ion conductive material. When the internal current collector layer 74 further includes an ion conductive material, voltage stabilizing characteristics of a battery may be improved.

Since the same poles are arranged on both ends of the internal current collector layer 74 in the MLC solid battery 710, the MLC solid battery 710 may be a monopolar-type MLC solid battery, in which a plurality of single cells are connected in parallel by arranging the internal current collector layer 74. In this regard, the MLC solid battery 710 may be obtained as a high-capacity MLC solid battery.

In the MLC solid battery 710, the internal current collector layer 74 between Single Cell 1 and Single Cell 2 includes an electron conductive material, and thus two adjacent single cells may be electrically connected in parallel, and at the same time, the cathode layer 71 or the anode layer 72 of the two adjacent single cells may be ion conductively connected. As a result, potentials of the cathode layers 71 or the anode layers 72 of the adjacent single cells may be averaged through the internal current collector 74, and thus a stable output voltage may be obtained.

Also, external current collecting members, such as tabs, may be removed, and single cells constituting a MLC solid battery 710 may be electrically connected in parallel. Therefore, the MLC solid battery 710 having excellent space saving and cost effectiveness may be prepared.

Referring to FIG. 8, a stack includes a cathode layer 81, an anode layer 82, a solid electrolyte layer 83, and an internal current collector layer 84. A plurality of the stacks are laminated and heat-pressed to prepare a MLC solid battery stack 810. The cathode layer 81 is formed of a single sheet for a cathode layer. The anode layer 82 is formed of two sheets for an anode layer. The cathode layer 81 includes the composite cathode active material according to an embodiment.

Figure 9A:
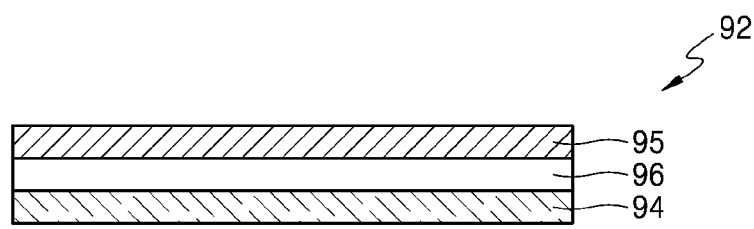
FIGS. 9A and 9B are schematic views of another embodiment of a structure of a secondary battery.
Figure 9B:
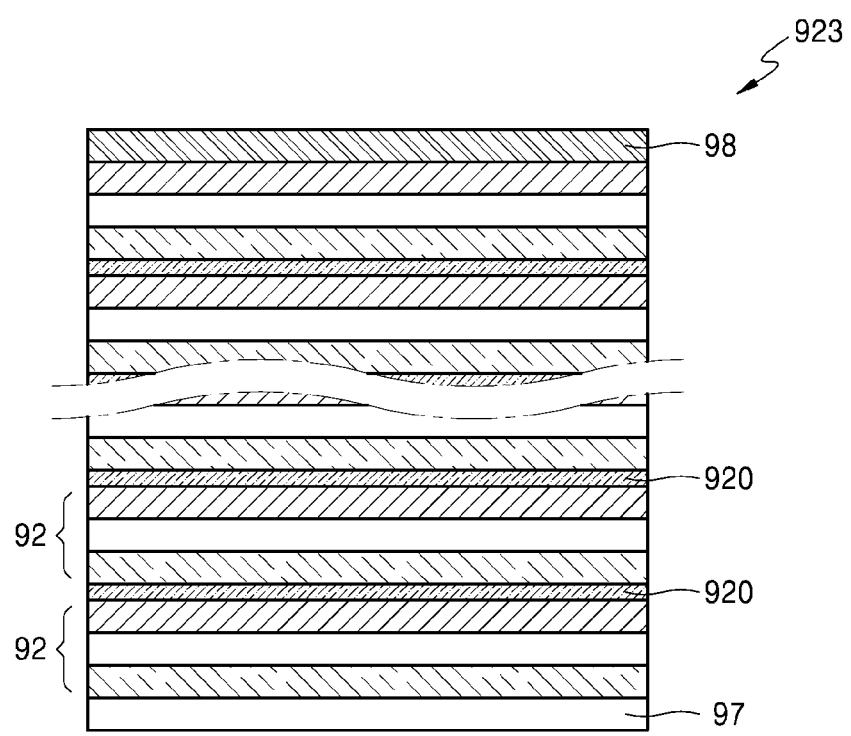

FIGS. 9A and 9B are each a schematic view of a stack of an all-solid secondary battery according to another embodiment. Each of cathode active material layers in FIGS. 9A and 9B includes the composite cathode active material according to an embodiment.

FIG. 9A shows a structure of a unit cell 92, which is the most basic unit constituting an all-solid secondary battery. The unit cell 92 has a structure, in which a cathode active material layer 94, a solid electrolyte layer 96, and an anode active material layer 95 are sequentially stacked.

FIG. 9B shows a structure of a stack 923 constituting an all-solid secondary battery.

The all-solid secondary battery has a cathode extraction electrode in contact with a cathode active material layer at a lower end and an anode extraction electrode in contact with an anode active material layer at an upper end. As used herein, the terms "upper end" and "lower end" represent relative position relationship.

Referring to FIG. 9B, the stack 923 has a structure, in which a plurality of the unit cells 92 are stacked such that the cathode active material layer 94 and the anode active material layer 95 face each other and that a current collector layer is located at an uppermost layer and a lowermost layer. One of the current collector layers at the uppermost layer and the lowermost layer connects to the cathode active material layer 94 and becomes a cathode current collector, and the other current collector layer connects to the anode active material layer 95 and becomes an anode current collector. A current collector layer 97 of the lowermost layer connects to the cathode active material layer 94 and becomes a cathode current collector, and a current collector layer 98 of the uppermost layer connects to the anode active material layer 95 and becomes an anode current collector. The current collector layers may serve as extraction electrodes.

In FIG. 9B, the current collector layer 97 of the lowermost layer may serve as a cathode extraction electrode, and the current collector layer 98 of the uppermost layer may serve as an anode extraction electrode. In some embodiments, an extraction electrode may be additionally arranged on the current collector layer. For example, a cathode extraction electrode may be in contact with the current collector layer 97 the lower end, and an anode extraction electrode may be in contact with the current collector layer 98 the upper end.

In FIG. 9B, the stack 923 has a structure in which a metal layer 920 is disposed between the unit cells 92. When the metal layer 920 is included in the stack 923, migration of ions remains in an individual cell unit, and thus the stack 923 may serve as a series-type all-solid secondary battery. The stack 923 of FIG. 9B includes the current collector layer, but the current collector layer is optional as described above.

In the stack 923 of the all-solid secondary battery, when the number of the unit cells 92 is equal to or greater than 2, a so-called series-type all-solid secondary battery may be manufactured. The number of unit cells may be selected based on the desired capacity or voltage of an all-solid secondary battery.

In some embodiments, the secondary battery may be, for example, an all-solid secondary battery including a cathode layer including a cathode active material layer; an anode layer including an anode current collector layer and a first anode active material layer, a third anode active material layer, or a combination thereof; and a solid electrolyte layer disposed between the cathode layer and the anode layer, wherein the cathode active material layer includes the composite cathode active material according to an embodiment.

The first anode active material layer may include at least one of a carbonaceous anode active material or a metal or metalloid anode active material.

The carbonaceous anode active material includes at least one of an amorphous carbon or crystalline carbon, and the metal or metalloid anode active material includes at least one of gold (Au), platinum (Pt), palladium (Pd), silicon (Si), silver (Ag), aluminum (Al), bismuth (Bi), tin (Sn), or zinc (Zn).

The all-solid secondary battery further includes, for example, a second anode active material layer that is disposed at least between the anode current collector and the first anode active material layer, or between the solid electrolyte layer and the first anode active material layer. The second anode active material layer is a metal layer including lithium or a lithium alloy.

In the all-solid secondary battery, for example, the third anode active material layer may be a metal layer including lithium or a lithium alloy.

Figure 10:
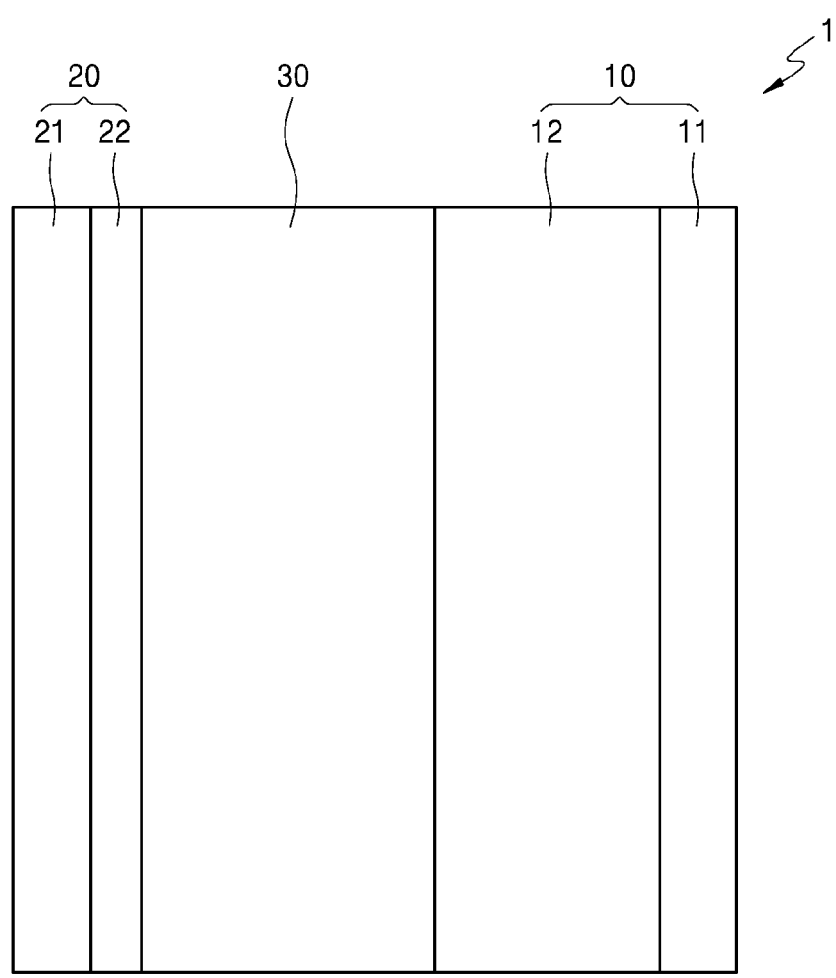
FIGS. 10 to 12 are schematic views of an embodiment of a structure of an all-solid secondary battery.
Figure 11:
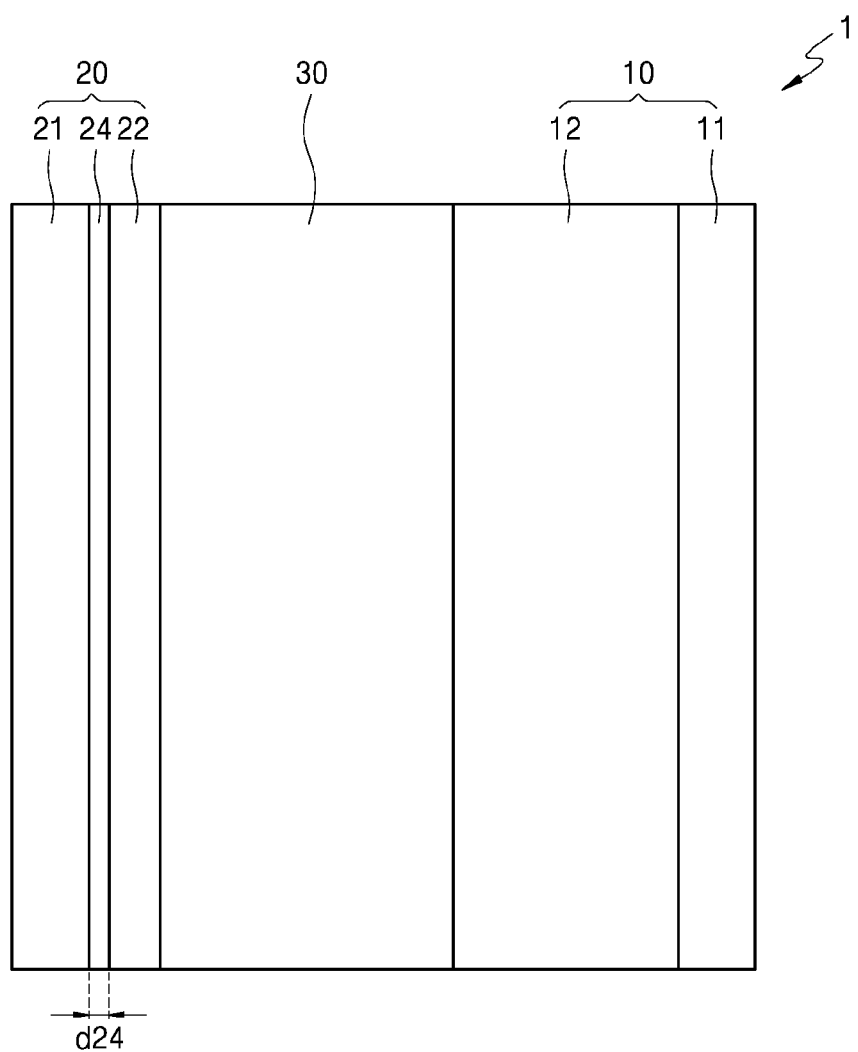
Figure 12:
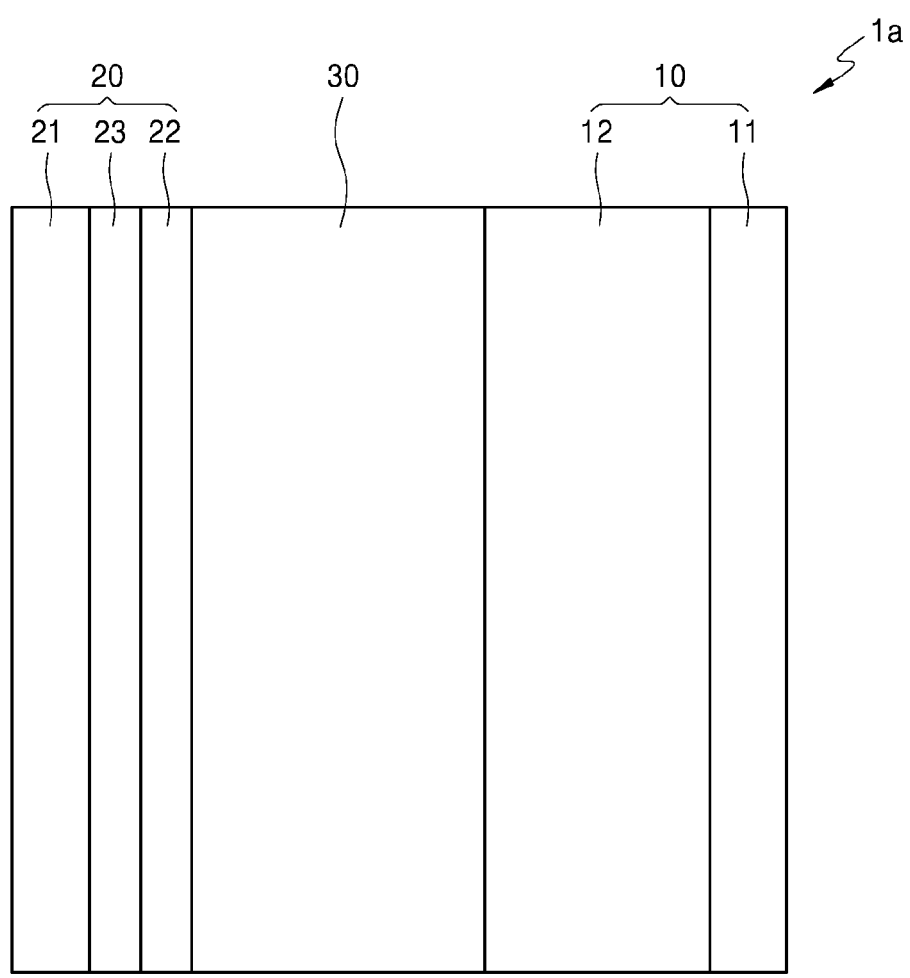

Referring to FIGS. 10 to 12, an all-solid secondary battery 1 includes an anode layer 20 including an anode current collector layer 21 and a first anode active material layer 22; a cathode layer 10 including a cathode current collector layer 11 and a cathode active material layer 12; and a solid electrolyte layer 30 disposed between the anode layer 20 and the cathode layer 10. The cathode layer 10 may include a solid electrolyte. The cathode active material layer 12 in FIGS. 10 to 12 includes the composite cathode active material according to an embodiment. The cathode layer 10 may include, for example, the cathode active material, the solid electrolyte, and the conducting agent described herein.

Anode Layer

Referring to FIGS. 10 to 12, the anode layer 20 includes an anode current collector layer 21 and a first anode active material layer 22, and the first anode active material layer 22 includes an anode active material. The anode current collector layer 21 may be omitted.

The anode active material in the first anode active material layer 22 may be, for example, in the form of particles. An average particle diameter of the anode active material in the form of particles may be, for example, about 4 micrometer (μm) or less, about 3 μm or less, about 2 μm or less, about 1 μm or less, or about 900 nm or less. An average particle diameter of the anode active material in the form of particles may be, for example, in a range of about 10 nanometers (nm) to about 4 μm, about 10 nm to about 2 μm, about 10 nm to about 1 μm, or about 10 nm to about 900 nm. When the average particle diameter of the anode active material is within these ranges, reversible absorbing and/or desorbing of lithium during charging and discharging may further be facilitated. The average particle diameter of the anode active material is, for example, a median diameter (D50) measured using a laser particle size distribution meter.

The anode active material in the first anode active material layer 22 may include, for example, at least one of a carbonaceous anode active material or a metal or metalloid anode active material.

The carbonaceous anode active material may be, for example, amorphous carbon. Amorphous carbon may be, for example, carbon black (CB), acetylene black (AB), furnace black (FB), ketjen black (KB), or graphene, but embodiments are not limited thereto, and any suitable amorphous carbon in the art may be used. Amorphous carbon is carbon having no crystallinity or very low crystallinity and is distinguishable from crystalline carbon or graphite-based carbon.

The metal anode active material or metalloid anode active material includes at least one of gold (Au), platinum (Pt), palladium (Pd), silicon (Si), silver (Ag), aluminum (Al), bismuth (Bi), tin (Sn), or zinc (Zn), but embodiments are not limited thereto, and any suitable metal anode active material or metalloid anode active material capable of forming an alloy or a compound with lithium in the art may be used. For example, nickel (Ni) does not form an alloy with lithium and thus is not a metal anode active material.

The first anode active material layer 22 may include one type of an anode active material or a mixture of a plurality of different anode active materials among these anode active materials. For example, the first anode active material layer 22 may include only amorphous carbon or at least one of gold (Au), platinum (Pt), palladium (Pd), silicon (Si), silver (Ag), aluminum (Al), bismuth (Bi), tin (Sn), or zinc (Zn). In some embodiments, the first anode active material layer 22 may include a mixture of amorphous carbon and at least one of gold (Au), platinum (Pt), palladium (Pd), silicon (Si), silver (Ag), aluminum (Al), bismuth (Bi), tin (Sn), or zinc (Zn). A mixing ratio of the amorphous carbon and gold (Au), as a weight ratio, may be, for example, about 10:1 to about 1:2, about 5:1 to about 1:1, or about 4:1 to about 2:1, but embodiments are not limited thereto, and the mixing ratio may be selected according to desired characteristics of the all-solid secondary battery 1. As the anode active layer has the composition described herein, cycle characteristics of the all-solid secondary battery 1 may be further enhanced.

The anode active material included in the first negative electrode active material layer 22 may include, for example, a mixture of first particles formed of amorphous carbon and second particles formed of a metal or a metalloid. Examples of the metal or metalloid may include gold (Au), platinum (Pt), palladium (Pd), silicon (Si), silver (Ag), aluminum (Al), bismuth (Bi), tin (Sn), and zinc (Zn). In some embodiments, the metalloid may be a semiconductor. An amount of the second particles may be in a range of about 8 weight percent (wt %) to about 60 wt %, about 10 wt % to about 50 wt %, about 15 wt % to about 40 wt %, or about 20 wt % to about 30 wt % based on the total weight of a mixture of first particles and second particles. When the amount of the second particles is within these ranges, for example, cycle characteristics of the all-solid secondary battery 1 may be further improved.

The first anode active material layer 22 may include, for example, a binder. The binder may be, for example, styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, or polymethyl methacrylate, but embodiments are not limited thereto, and any suitable binder in the art may be used. The binder may include a single binder or a plurality of different binders.

When the first anode active material layer 22 includes the binder, the first anode active material layer 22 may be stabilized on the anode current collector layer 21. Also, cracking of the first negative electrode active material layer 22 may be prevented despite a volume change and/or a relative position change of the first anode active material layer 22 in a charge/discharge process. For example, when the first anode active material layer 22 does not include the binder, the first anode active material layer 22 may be easily separated from the anode current collector layer 21. A portion where the first anode active material layer 22 is separated from the anode current collector layer 21 may be exposed to the anode current collector layer 21 and contacts the solid electrolyte layer 30, thereby increasing the possibility of a short circuit. The first anode active material layer 22 may be prepared, for example, by applying a slurry, in which materials forming the first anode active material layer 22 are dispersed, on the anode current collector layer 21, and drying the slurry. The anode active material may be stably dispersed in the slurry by including the binder in the first anode active material layer 22. For example, when the slurry is applied on the anode current collector layer 21 using a screen-printing method, clogging of a screen (for example, clogging by agglomerates of the anode active material) may be prevented.

A thickness (d22) of the first anode active material layer 22 may be, for example, about 50% or less, about 30% or less, about 10% or less, or about 5% or less of a thickness d12 of the cathode active material layer 12. A thickness (d22) of the first anode active material layer may be, for example, in a range of about 1 μm to about 20 μm, about 2 μm to about 10 μm, or about 3 μm to about 7 μm. When the thickness (d22) of the first anode active material layer 22 is within these ranges, the all-solid-state secondary battery 1 may have excellent cycle characteristics.

A charge capacity of the first anode active material layer 22 may be, for example, about 50% or less, about 40% or less, about 30% or less, about 20% or less, about 10% or less, about 5% or less, or about 2% or less of a charge capacity of the cathode active material layer 12. A charge capacity of the first anode active material layer 22 may be, for example, in a range of about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the cathode active material layer 12. When the charge capacity of the first anode active material layer 22 is within these ranges, the all-solid secondary battery 1 may have excellent cycle characteristics. A charge capacity of the cathode active material layer 12 may be obtained by multiplying a charge capacity density in milliampere hours per gram (mAh/g) of the cathode active material by a mass of the cathode active material in the cathode active material layer 12. The anode current collector layer 21 may be formed of, for example, a material which does not react with lithium, that is, does not form an alloy or a compound. Materials forming the anode current collector layer 21 may be, for example, copper (Cu), stainless steel, titanium (Ti), iron (Fe), cobalt (Co), and nickel (Ni), but embodiments are not limited thereto, and any suitable material for an electrode current collector in the art may be used. The anode current collector layer 21 may be formed of a single metal or may be formed of an alloy of two or more types of metal or may be formed of a coating material. The anode current collector layer 21 may be, for example, in the form of a plate or a foil.

The first anode active material layer 22 may further include additives, for example, at least one of a filler, a dispersant, or an ion conductive agent used for an all-solid secondary battery of the related art.

Referring to FIG. 11, the all-solid secondary battery 1 further includes a thin film 24 including an element alloyable with lithium on the anode current collector layer 21. The thin firm 24 may be disposed between the anode current collector layer 21 and the first anode active material layer 22. The thin firm 24 may include, for example, an element alloyable with lithium. Examples of an element alloyable with lithium may be gold, silver, zinc, tin, indium, silicon, aluminum, or bismuth, but embodiments are not limited thereto, and any suitable element alloyable with lithium in the art may be used. The thin firm 24 may be formed of one of these metals or an alloy of various metals. When the thin firm 24 may be disposed on the anode current collector layer 21, the form of precipitation of the second anode active material layer (not shown), precipitated between the thin firm 24 and the first anode active material layer 22 may be further flattened, and thus cycle characteristics of the all-solid secondary battery 1 may be further improved.

A thickness d24 of the thin firm 24 may be, for example, in a range of about 1 nm to about 800 nm, about 10 nm to about 700 nm, about 50 nm to about 600 nm, or about 100 nm to about 500 nm. When a thickness d24 of the thin firm 24 is within these ranges, an energy density and cycle characteristics of the all-solid secondary battery 1 may be excellent. The thin firm 24 may be disposed on the anode current collector layer 21, for example, using at least one of a vacuum deposition method, a sputtering method, or a plating method, but embodiments are not limited thereto, and any method of forming a thin film in the art may be used.

Referring to FIG. 12, the all-solid secondary battery 1 can further include, for example, a second anode active material layer 23 disposed between the anode current collector layer 21 and the solid electrolyte layer 30. The all-solid secondary battery 1 may further include the second anode active material layer 23 precipitated between the anode current collector layer 21 and the first anode active material layer 22 by charging. The second anode active material layer 23 may be, for example, a plated lithium layer.

The second anode active material layer 23 may be a metal layer including lithium or a lithium alloy. Accordingly, since the second anode active material layer 23 is a metal layer including lithium, the second anode active material layer 23 may serve as, for example, a lithium reservoir. Examples of a lithium alloy may be, for example, a Li—Al alloy, a Li—Sn alloy, a Li—In alloy, a Li—Ag alloy, a Li—Au alloy, a Li—Zn alloy, a Li—Ge alloy, or a Li—Si alloy, but embodiments are not limited thereto, and any suitable lithium alloy in the art may be used. The second anode active material layer 23 may be formed of one lithium alloy selected from these examples, lithium, or of various types of alloys.

A thickness (d23) of the second anode active material layer 23 is not particularly limited, but may be, for example, in a range of about 10 µm to about 200 µm, about 10 µm to about 100 µm, or about 20 µm to about 100 µm. When a thickness (d23) of the second anode active material layer 23 is within these ranges, the all-solid-state secondary battery 1 may have excellent cycle characteristics. The second anode active material layer 23 may be, for example, a metal foil having a thickness within these ranges.

In the all-solid secondary battery 1, the second anode active material layer 23, for example, may be disposed between the anode current collector layer 21 and the first anode active material layer 22 before assembling the all-solid secondary battery 1, or may be precipitated between the anode current collector layer 21 and the first anode active material layer 22 by charging after assembling the all-solid secondary battery 1.

When the second anode active material layer 23 is disposed between the anode current collector layer 21 and the first anode active material layer 22 before assembling the all-solid secondary battery 1, the second anode active material layer 23 may serve as a lithium reservoir since the second anode active material layer 23 is a metal layer including lithium. Cycle characteristics of the all-solid secondary battery 1 including the second anode active material layer 23 may be further improved. For example, a lithium foil is disposed between the anode current collector layer 21 and the first anode active material layer 22 before assembling the all-solid secondary battery 1.

When the second anode active material layer 23 is disposed by charging after assembling the all-solid secondary battery 1, the second anode active material layer 23 is not included when the all-solid secondary battery 1 is assembled, and thus the energy density of the all-solid secondary battery 1 increases. For example, when the all-solid secondary battery 1 is charged, charging is performed in excess of the charge capacity of the first anode active material layer 22. That is, the first anode active material layer 22 is overcharged. At an initial stage of charging, lithium is absorbed in the first anode active material layer 22. That is, the anode active material included in the first anode active material layer 22 forms an alloy or a compound with lithium ions having moved from the cathode layer 10. When a charge exceeds the capacity of the first anode active material layer 22, for example, lithium is precipitated on a back surface of the first anode active material layer 22, that is, between the anode current collector layer 21 and the first anode active material layer 22, and a metal layer corresponding to the second anode active material layer 23 is formed by the precipitated lithium. The second anode active material layer 23 is a metal layer mainly formed of lithium (i.e., lithium metal). Such a result is obtained because, for example, the anode active material included in the first anode active material layer 22 is formed of a material that is capable of forming an alloy or a compound with lithium. During discharge, lithium of the first anode active material layer 22 and the second anode active material layer 23, that is, metal layers, is ionized and moves towards the cathode layer 10. Therefore, lithium may be used as an anode active material in the all-solid secondary battery 1. Also, the first anode active material layer 22 covers the second anode active material layer 23 and thus can serve as a protective layer for the second anode active material layer 23, that is, a metal layer, and serves to suppress the growth of precipitation of lithium dendrites at the same time. Therefore, a short-circuit and capacity reduction of the all-solid secondary battery 1 may be suppressed, and, as a result, cycle characteristics of the all-solid secondary battery 1 may be improved. In addition, when the second anode active material layer 23 is disposed by charging the all-solid secondary battery 1 after assembly, the anode current collector layer 21, the first anode active material layer 22, and a region therebetween, for example, are Li-free regions, which do not contain lithium (Li) metal or a lithium (Li) alloy in an initial state or a post-discharge state of the all-solid secondary battery 1.

Referring to FIG. 12, the all-solid secondary battery 1 has a structure in which the second anode active material layer 23 is disposed on the anode current collector layer 21, and the solid electrolyte layer 30 is directly disposed on the second anode active material layer 23. The second anode active material layer 23 is, for example, a lithium metal layer or a lithium alloy layer.

Solid Electrolyte Layer

Referring to FIGS. 10 to 12, the solid electrolyte layer 30 may include an oxide-based solid electrolyte.

The oxide-based solid electrolyte may be, for example, at least one of $Li_{1+x+y}Al_xTi_{2-x}Si_yP_{3-y}O_{12}$ (where $0<x<2$ and $0\leq y<3$), $BaTiO_3$, $Pb(Zr_xTi_{1-x})O_3$ (PZT) ($0\leq x\leq 1$), $Pb_{1-x}La_xZr_{1-y}Ti_yO_3$ (PLZT, where $0\leq x<1$ and $0\leq y<1$), $Pb(Mg_{3}Nb_{2/3})O_3$-$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where, $0<x<2$ and $0<y<3$), $Li_xAl_yTi_z(PO_4)_3$ (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0\leq x\leq 1$, $0\leq y\leq 1$, $0\leq a\leq 1$, and $0\leq b\leq 1$), $Li_xLa_yTiO_3$ (where $0<x<2$ and $0<y<3$), $Li_2O$, $LiOH$, $Li_2CO_3$, $LiAlO_2$, $Li_2O$-$Al_2O_3$-$SiO_2$-$P_2O_5$-$TiO_2$-$GeO_2$, or $Li_{3+x}La_3M_2O_{12}$ (where M is at least one of Te, Nb, or Zr, and x is an integer of 1 to 10).

The oxide-based solid electrolyte may be, for example, a garnet-type solid electrolyte of at least one of $Li_7La_3Zr_2O_{12}$ (LLZO), $Li_{3+x}La_3Zr_{2-a}M_aO_{12}$ (M-doped LLZO, where M is Ga, W, Nb, Ta, or Al, x is an integer of 1 to 10, and $0.05\leq a\leq 0.7$).

In one embodiment, the solid electrolyte layer 30 may include a LLZO solid electrolyte.

The solid electrolyte layer 30 may include, for example, $Li_7La_3Zr_2O_{12}$ (LLZO), $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_{6.4}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}WO_{0.3}O_{12}$, $Li_{5.39}Ga_{1.61}La_3Zr_{1.7}W_{0.3}O_{1.7}Li_{6.5}La_3Zr_{1.5}Ta_{0.3}O_{12}$, or a combination thereof.

Cathode Layer

The cathode layer 10 can include a cathode current collector layer 11 and a cathode active material layer 12.

The cathode current collector layer 11 may be, for example, a plate or foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector layer 11 may be omitted.

The cathode active material layer 12 may include, for example, a cathode active material and a solid electrolyte. The solid electrolyte included in the cathode layer 10 is similar to or different from the solid electrolyte included in the solid electrolyte layer 30. Details of the solid electrolyte may refer to the description in relation to the solid electrolyte layer 30. In one embodiment, the solid electrolyte may include an oxide-based solid electrolyte.

The cathode layer 10 may include the composite cathode active material according to an embodiment.

A shape of particles of the cathode active material may be, for example, a sphere shape or an elliptical shape. A particle diameter of the cathode active material is not particularly limited and is within a range applicable to a cathode active material of an all-solid secondary battery of the related art. An amount of the cathode active material of the cathode layer 10 is not particularly limited and is within a range applicable to a cathode layer of an all-solid secondary battery of the related art.

The cathode layer 10 may further include additives, for example, at least one of a conducting agent, a binder, a filler, a dispersant, or an ion conductive agent, in addition to the cathode active material and the solid electrolyte. The conducting agent may be, for example, at least one of graphite, carbon black, acetylene black, Ketjen black, carbon fibers, or a metal powder. The binder may be, for example, at least one of styrene butadiene rubber (SBR), polytetrafluoroethylene, polyvinylidene fluoride, or polyethylene. As a coating agent, a dispersant, or an ion conductive agent, which may be mixed with the anode layer 10, materials commonly used in an electrode of a solid secondary battery may be used.

A method of preparing an all-solid secondary battery may include stacking a solid electrolyte layer 30 on a cathode layer 10 to prepare a stack; and stacking an anode layer 20 on the stack.

In some embodiments, the solid electrolyte layer 30 may be prepared by coating and drying a composition for forming a solid electrolyte layer on a separate substrate and detaching the composition from the substrate or the solid electrolyte may be prepared in the form of a sheet including the substrate. The substrate may be, for example, polyethylene terephthalate film or polyethylene non-woven fabric.

In some embodiments, the solid electrolyte layer 30 may be prepared by coating and drying or by transferring a composition for forming a first solid electrolyte layer on the cathode 10.

Subsequently, the cathode layer 10, the solid electrolyte layer 30, and the anode layer 20 may be packaged using a packaging material, and then pressed to manufacture an all-solid battery. The pressing may be performed using roll pressing, hot pressing, or warm isostatic pressing.

When roll pressing or hot pressing is used for the pressing, mass production is possible, and a close interface may be formed in a process of compressing the electrode layers and the solid electrolyte layer.

Preparation of Anode Layer

Materials forming a first anode active material layer 22, such as an anode active material, a conducting agent, a binder, and a solid electrolyte are added to a polar solvent or a non-polar solvent to prepare a slurry. The slurry is coated and dried on an anode current collector 21 to prepare a first stack. Subsequently, the dried first stack is pressed to prepare an anode layer 20. The pressing is, for example, roll pressing or flat pressing, but embodiments are not limited thereto, and any pressing method in the art may be used. The pressing process may be omitted.

The anode layer includes a first anode active material layer including an anode current collector and an anode active material disposed on the anode current collector, wherein the anode active material includes at least one of a carbonaceous anode active material or a metal or metalloid anode active material, wherein the carbonaceous anode active material includes at least one of amorphous carbon or crystalline carbon. In addition, the metal or metalloid anode active material includes at least one of gold (Au), platinum (Pt), palladium (Pd), silicon (Si), silver (Ag), aluminum (Al), bismuth (Bi), tin (Sn), or zinc (Zn).

The anode layer may further include a second anode active material layer between the anode current collector and the first anode active material layer and/or between the solid electrolyte layer and the first anode active material layer, wherein the second anode active material layer is a metal layer including lithium or a lithium alloy.

Preparation of Cathode Layer

Materials forming a cathode active material layer 12, such as a cathode active material, a conducting agent, a binder, and a solid electrolyte are added to a non-polar solvent to prepare a slurry. The cathode active material may be the composite cathode active material according to an embodiment. The slurry is coated and dried on a cathode current collector 11 to prepare a stack. The stack is pressed to prepare a cathode layer 10. The pressing of the laminate may be performed using roll pressing, flat pressing, or warm isostatic pressing, but embodiments are not limited thereto, and any pressing method in the art may be used. The pressing process may be omitted. In some embodiments, a mixture of materials forming the cathode active material layer 12 is densification-molded in the form of a pellet or extension-molded in the form of sheet to prepare a cathode layer 10. When the cathode layer 10 is prepared in this manner, a cathode current collector 11 may be omitted.

Preparation of Solid Electrolyte Layer

A solid electrolyte layer 30 can be prepared using, for example, the solid electrolyte formed of an oxide-based electrolyte material.

Preparation of All-Solid Secondary Battery

The cathode layer 10, the anode layer 20, and the solid electrolyte layer 30 prepared using the methods disclosed herein are stacked to dispose the solid electrolyte layer 30 between the cathode layer 10 and the anode layer 20 and then pressed to prepare an all-solid secondary battery 1.

For example, the solid electrolyte layer 30 is disposed on the cathode layer 10 to prepare a second stack. Subsequently, the anode layer 20 is disposed on the second stack such that the solid electrolyte layer 30 is in contact with the first anode active material layer to prepare an all-solid secondary battery 1.

As described above, the structure and the preparation method of the all-solid secondary battery 1 are examples of an embodiment, where members of the structure and the preparation process may be appropriately modified.

The all-solid secondary battery 1 may be installed on a small-sized intelligent transportation system (ITS) or a large-sized electric vehicle, depending on a capacity and a size of the battery.

The composite cathode active material according to an embodiment may be prepared using a wet method or a dry method.

Hereinafter, a dry method of preparing the composite cathode active material according to an embodiment will be described. The composite cathode active material is a compound represented by Formula 1. Examples of the dry method may include a solid phase method.

First, a M1 precursor, a lithium precursor, a cobalt precursor, and a phosphorus precursor are mixed to prepare a precursor mixture. Here, M1 of the M1 precursor is identical to M1 of Formula 1.

In the precursor mixture, amounts of the M1 precursor, lithium precursor, cobalt precursor, and phosphorus precursor are stoichiometrically controlled to obtain a composite cathode active material of Formula 1.

The mixing may be performed by, for example, mechanical milling. During the mechanical milling, a solvent may be added when needed. The solvent may be, for example, acetone, ethanol, water, ethylene glycol, isopropanol, or a combination thereof. An amount of the solvent may be in a range of about 50 parts to about 1,000 parts by weight, for example, about 100 parts to about 300 parts by weight, based on 100 parts by weight of the total weight of the precursor mixture. When the solvent is added, mixing of the precursors may be homogenously performed.

The mechanical milling may be performed using a method known in the art. The milling may be performed by, for example, ball mill, air jet mill, bead mill, roll mill, or planetary mill.

The lithium precursor may be, for example, at least one of lithium oxide, lithium carbonate, lithium chloride, lithium sulfide, lithium nitrate ($LiNO_3$), lithium phosphate, or lithium hydroxide.

The cobalt precursor may be, for example, at least one of cobalt oxide, cobalt sulfate, cobalt hydroxide, cobalt nitrate, or cobalt oxalate.

The phosphorus precursor may be, for example, at least one of $(NH_4)_2HPO_4$, $(NH_4)H_2PO_4$, $LiPO_3$, or $LiH_2PO_4$.

The precursor mixture may further include a M2 precursor. M2 of the M2 precursor may be identical to M2 of Formula 1-1.

The M1 precursor may be, for example, a M1-containing oxide, a M1-containing carbonate, a M1-containing chloride, a M1-containing phosphate, a M1-containing hydroxide, a M1-containing nitrate, a M1-containing hydroxide, a M1-containing oxalate, or a combination thereof.

The cobalt precursor may be, for example, cobalt oxide, cobalt sulfate, cobalt hydroxide, cobalt nitrate, cobalt oxalate, or a combination thereof.

The M1 precursor may be, for example, at least one of scandium oxide, scandium sulfate, scandium hydroxide, scandium nitrate, scandium oxalate, titanium oxide, titanium sulfate, titanium hydroxide, titanium nitrate, titanium oxalate, vanadium oxide, vanadium sulfate, vanadium hydroxide, vanadium nitrate, vanadium oxalate, copper oxide, copper sulfate, copper hydroxide, copper nitrate, copper oxalate, zinc oxide, zinc sulfate, zinc hydroxide, zinc nitrate, or zinc oxalate.

The M2 precursor may be, for example, at least one of nickel oxide, nickel sulfate, nickel hydroxide, nickel nitrate, nickel oxalate, iron oxide, iron sulfate, iron hydroxide, iron nitrate, or iron oxalate.

The phosphorus (P) precursor may be, for example, at least one of $(NH_4)_2HPO_4$, $(NH_4)H_2PO_4$, $LiPO_3$, or $LiH_2PO_4$.

After the mixing, the resultant of the above process is heat-treated to obtain a compound represented by Formula 1. The heat-treating may be performed at a temperature, for example, in a range of about 600° C. to about 900° C., about 650° C. to about 850° C., or about 650° C. to about 750° C. The heat-treating is performed under an inert gas atmosphere or an oxidizing gas atmosphere. The inert gas atmosphere may use an inert gas such as argon or nitrogen. The oxidizing gas atmosphere may use an oxidizing gas such as air or oxygen. A rate of increasing temperature of the heat-treating may be in a range of about 1° C. to about 10° C. The heat-treating may be performed for about 1 hour to about 48 hours, about 6 hours to about 24 hours, or about 6 hours to about 18 hours.

A drying process may be optionally performed before the heat-treating process. When the drying is performed, the drying may be performed at a temperature in a range of about 30° C. to about 150° C., about 50° C. to about 130° C., about 60° C. to about 120° C., or about 80° C. to about 100° C. When the drying is performed, the cathode active material may have improved energy density.

In some embodiments, the compound of Formula 1 may be prepared using a liquid phase method instead of the solid phase method described above.

Hereinafter, one or more embodiments will be described in detail with reference to Examples and Comparative Examples. However, these are provided for illustrative purposes only, and are not limited thereto.

Preparation of Composite Cathode Active Material

Preparation Example 1

$LiH_2PO_4$, CoO, TiO, and sucrose ($C_{12}H_{22}O_{11}$) were mixed to obtain a precursor mixture, and ethanol was added to the precursor mixture and mixed in a beaker for 10 hours. Amounts of $LiH_2PO_4$, CoO, and TiO were stoichiometrically controlled to obtain cathode active materials having compositions of Table 1, and an amount of sucrose was controlled such that a carbonaceous material on the surface of the composite cathode active material was about 3 parts by weight based on 100 parts by weight of the total amount of the composite cathode active material. A carbonaceous coating layer was arranged on a surface of the composite cathode active material. An amount of ethanol was about 100 parts by weight based on 100 parts by weight of the total amount of $LiH_2PO_4$, CoO, and TiO.

The mixed resultant was dried at about 150° C. for about 12 hours, and the dried resultant was heat-treated in an argon (Ar) atmosphere at about 750° C. for about 12 hours to obtain a cathode active material. Thus obtained cathode active material was mixed with ethanol and pulverized at a rate of about 300 rpm using a ball mill under conditions of 30 minutes of driving/10 minutes of resting, and the pulverization was repeated 40 times. The resultant was dried at about 100° C. for about 12 hours to evaporate ethanol, and the dried resultant was heat-treated in an argon (Ar) atmosphere at about 750° C. for about 1 minute to obtain a composite cathode active material.

Preparation Example 2

A composite cathode active material was prepared in the same manner as in Preparation Example 1, except that $V_2O_3$ was used instead of TiO in the preparation of a precursor mixture and that amounts of the compounds constituting the precursor mixture were stoichiometrically controlled to obtain a composite cathode active material having a composition of Table 1.

Preparation Example 3

A composite cathode active material was prepared in the same manner as in Preparation Example 1, except that $V_2O_3$ was used instead of TiO in the preparation of a precursor mixture and that amounts of the compounds constituting the precursor mixture were stoichiometrically controlled to obtain a composite cathode active material having a composition of Table 1.

Preparation Example 4

A composite cathode active material was prepared in the same manner as in Preparation Example 1, except that $Zn(NO_3)_2 \cdot 6H_2O$ was used instead of TiO in the preparation of a precursor mixture and that amounts of the compounds constituting the precursor mixture were stoichiometrically controlled to obtain a composite cathode active material having a composition of Table 1.

Preparation Example 5

A composite cathode active material was prepared in the same manner as in Preparation Example 1, except that CuO was used instead of TiO in the preparation of a precursor mixture and that amounts of the compounds constituting the precursor mixture were stoichiometrically controlled to obtain a composite cathode active material having a composition of Table 1.

Preparation Example 6

A composite cathode active material was prepared in the same manner as in Preparation Example 1, except that $Sc_2O_3$ was used instead of TiO in the preparation of a precursor mixture and that amounts of the compounds constituting the precursor mixture were stoichiometrically controlled to obtain a composite cathode active material having a composition of Table 1.

Preparation Example 7

A composite cathode active material was prepared in the same manner as in Preparation Example 1, except that NiO and $Zn(NO_3)_2 \cdot 6H_2O$ were added instead of TiO in the preparation of a precursor mixture and that amounts of the compounds constituting the precursor mixture were stoichiometrically controlled to obtain a composite cathode active material having a composition of Table 1.

Preparation Example 8

A composite cathode active material was prepared in the same manner as in Preparation Example 1, except that $FeC_2O_4 \cdot 2H_2O$ and $Zn(NO_3)_2 \cdot 6H_2O$ were added instead of TiO in the preparation of a precursor mixture and that amounts of the compounds constituting the precursor mixture were stoichiometrically controlled to obtain a composite cathode active material having a composition of Table 1.

Preparation Example 9

A composite cathode active material was prepared in the same manner as in Preparation Example 1, except that $V_2O_3$ and $Zn(NO_3)_2 \cdot 6H_2O$ were added instead of TiO in the preparation of a precursor mixture and that amounts of the compounds constituting the precursor mixture were stoichiometrically controlled to obtain a composite cathode active material having a composition of Table 1.

Preparation Example 10

A composite cathode active material was prepared in the same manner as in Preparation Example 1, except that NiO and $V_2O_5$ were added instead of TiO in the preparation of a precursor mixture and that amounts of the compounds constituting the precursor mixture were stoichiometrically controlled to obtain a composite cathode active material having a composition of Table 1.

Preparation Example 11

A composite cathode active material was prepared in the same manner as in Preparation Example 1, except that $Zn(NO_3)_2 \cdot 6H_2O$ was added with TiO in the preparation of a precursor mixture and that amounts of the compounds constituting the precursor mixture were stoichiometrically controlled to obtain a composite cathode active material having a composition of Table 1.

Preparation Example 12

A composite cathode active material was prepared in the same manner as in Preparation Example 1, except that NiO and $FeC_2O_4 \cdot 2H_2O$ were added instead of TiO in the preparation of a precursor mixture and that amounts of the compounds constituting the precursor mixture were stoichiometrically controlled to obtain a composite cathode active material having a composition of Table 1.

Preparation Example 13

A composite cathode active material was prepared in the same manner as in Preparation Example 1, except that $V_2O_5$ and $FeC_2O_4 \cdot 2H_2O$ were added instead of TiO in the preparation of a precursor mixture and that amounts of the compounds constituting the precursor mixture were stoichiometrically controlled to obtain a composite cathode active material having a composition of Table 1.

Preparation Example 14

A composite cathode active material was prepared in the same manner as in Preparation Example 1, except that $FeC_2O_4 \cdot 2H_2O$ was added with TiO in the preparation of a precursor mixture and that amounts of the compounds constituting the precursor mixture were stoichiometrically controlled to obtain a composite cathode active material having a composition of Table 1.

Preparation Example 15

A composite cathode active material was prepared in the same manner as in Preparation Example 1, except that $V_2O_3$ was added with TiO in the preparation of a precursor mixture and that amounts of the compounds constituting the precursor mixture were stoichiometrically controlled to obtain a composite cathode active material having a composition of Table 1.

Preparation Examples 16 to 17

Composite cathode active materials were each prepared in the same manner as in Preparation Example 1, except that, in the preparation of a precursor mixture, amounts of TiO and CoO and amounts of the compounds constituting the precursor mixture were stoichiometrically controlled to obtain composite cathode active materials having compositions of Table 1.

Preparation Examples 18 to 19

Composite cathode active materials were each prepared in the same manner as in Preparation Example 3, except that, in the preparation of a precursor mixture, amounts of $V_2O_3$ and CoO and amounts of the compounds constituting the precursor mixture were stoichiometrically controlled to obtain composite cathode active materials having compositions of Table 1.

Comparative Preparation Example 1

A composite cathode active material was prepared in the same manner as in Preparation Example 1, except that $LiH_2PO_4$, CoO, and sucrose ($C_{12}H_{22}O_{11}$), instead of TiO, were mixed in the preparation of a precursor mixture and that amounts of the compounds constituting the precursor mixture/$LiH_2PO_4$, CoO, and sucrose were stoichiometrically controlled to obtain a composite cathode active material having a composition of Table 1.

Comparative Preparation Examples 2 to 4

Composite cathode active materials were each prepared in the same manner as in Preparation Example 1, except that $FeC_2O_4 \cdot 2H_2O$, MnO, and NiO, instead of TiO, were each added in the preparation of a precursor mixture and that amounts of the compounds constituting the precursor mixture/$FeC_2O_{4.2}H_2O$, MnO, and NiO were stoichiometrically controlled to obtain composite cathode active materials having compositions of Table 1.

Comparative Preparation Examples 5 to 6

Composite cathode active materials were each prepared in the same manner as in Comparative Preparation Example 2, except that, in the preparation of a precursor mixture, amounts of CoO and $FeC2O_{4.2}H_2O$ were controlled and that amounts of the compounds constituting the precursor mixture were stoichiometrically controlled to obtain composite cathode active materials having compositions of Table 1.

The compositions of the composite cathode active materials prepared in Preparation Examples 1 to 19 and Comparative Preparation Examples 1 to 6 were verified using inductively coupled plasma atomic emission spectroscopy (ICP-AES).

TABLE 1

| Sample | Composition |
|---|---|
| Preparation Example 1 | $LiCo_{0.9}Ti_{0.1}PO_4$ |
| Preparation Example 2 | $LiCo_{0.9}Cr_{0.1}PO_4$ |
| Preparation Example 3 | $LiCo_{0.9}V_{0.1}PO_4$ |
| Preparation Example 4 | $LiCo_{0.9}Zn_{0.1}PO_4$ |
| Preparation Example 5 | $LiCo_{0.9}Cu_{0.1}PO_4$ |
| Preparation Example 6 | $LiCo_{0.9}Sc_{0.1}PO_4$ |
| Preparation Example 7 | $LiCo_{0.9}Zn_{0.05}Ni_{0.05}PO_4$ |
| Preparation Example 8 | $LiCo_{0.9}Zn_{0.05}Fe_{0.05}PO_4$ |
| Preparation Example 9 | $LiCo_{0.9}Zn_{0.05}V_{0.05}PO_4$ |
| Preparation Example 10 | $LiCo_{0.9}Ni_{0.05}V_{0.05}PO_4$ |
| Preparation Example 11 | $LiCo_{0.9}Ti_{0.05}Zn_{0.05}PO_4$ |
| Preparation Example 12 | $LiCo_{0.9}Ni_{0.05}Fe_{0.05}PO_4$ |
| Preparation Example 13 | $LiCo_{0.9}V_{0.05}Fe_{0.05}PO_4$ |
| Preparation Example 14 | $LiCo_{0.9}Ti_{0.05}Fe_{0.05}PO_4$ |
| Preparation Example 15 | $LiCo_{0.9}Ti_{0.05}V_{0.05}PO_4$ |
| Preparation Example 16 | $LiCo_{0.95}Ti_{0.05}PO_4$ |
| Preparation Example 17 | $LiCo_{0.8}Ti_{0.2}PO_4$ |
| Preparation Example 18 | $LiCo_{0.95}V_{0.05}PO_4$ |
| Preparation Example 19 | $LiCo_{0.8}V_{0.2}PO_4$ |
| Comparative Preparation Example 1 | $LiCoPO_4$ |
| Comparative Preparation Example 2 | $LiCo_{0.9}Fe_{0.1}PO_4$ |
| Comparative Preparation Example 3 | $LiCo_{0.9}Mn_{0.1}PO_4$ |
| Comparative Preparation Example 4 | $LiCo_{0.9}Ni_{0.1}PO_4$ |
| Comparative Preparation Example 5 | $LiCo_{0.95}Fe_{0.05}PO_4$ |
| Comparative Preparation Example 6 | $LiCo_{0.8}Fe_{0.2}PO_4$ |

Preparation of Lithium Secondary Battery

EXAMPLE 1

The cathode active material of Preparation Example 1, carbon black as a conducting agent (Super-P, available from Timcal Ltd.), polyvinylidene fluoride (PVdF), and N-methylpyrrolidone were mixed to prepare a cathode slurry.

A mixed weight ratio of the cathode active material, carbon black, and PVDF in the cathode slurry was about 50:30:20, an amount of N-methyl pyrrolidone was about 20 g based on 1 g of the cathode active material.

The cathode slurry was coated on an aluminum foil having a thickness of about 15 μm and dried at a temperature of about 25° C., and the dried resultant was dried and roll-pressed in vacuum at a temperature of about 120° C. to prepare a cathode having a thickness of about 55 μm.

A lithium metal counter electrode was used as a counter electrode of the cathode to prepare a 2032 type coin cell. A separator formed of a porous polyethylene (PE) film having a thickness of about 16 μm was disposed between the cathode and the lithium metal counter electrode, and an electrolyte solution was injected to prepare a lithium secondary battery as a 2032 type coin cell. The electrolyte solution was a solution including 1.1 M LiPF6 dissolved in a solvent obtained by mixing ethylenecarbonate (EC) and ethylmethylcarbonate (EMC) at a volume ratio of 3:5.

EXAMPLES 2 to 19

Lithium secondary batteries were each prepared in the same manner as in Example 1, except that the cathode active materials of Examples 2 to 19 were used, respectively, instead of the cathode active material of Preparation Example 1.

Comparative Examples 1 to 6

Lithium secondary batteries were each prepared in the same manner as in Example 1, except that the cathode active material of Comparative Example 1 and the composite cathode active materials of Comparative Preparation Examples 2 to 6 were used, respectively, instead of the cathode active material of Preparation Example 1 in the preparation of the cathode.

Evaluation Example 1: X-Ray Diffraction Analysis

X-ray diffraction (XRD) analysis was performed on the cathode active materials prepared in Preparation Examples 1 to 6 and Comparative Preparation Examples 1 to 6.

The XRD analysis was performed by X'pert pro (PANalytical Co., Ltd.) using Cu Kα radiation (1.54056 Å).

The results of the XRD analysis performed on the composite cathode active materials of Preparation Examples 1 to 6, the cathode active material of Comparative Preparation Example 1, and the composite cathode active materials of Comparative Preparation Examples 2 and 3 are shown in FIGS. 1A to 1I. Unit-cell volumes of the cathode active materials from the XRD analysis results of the composite cathode active materials of Preparation Examples 1 to 19, the cathode active material of Comparative Preparation Example 1, and the composite cathode active materials of Comparative Preparation Examples 2 to 6 were measured and shown in Table 2.

Figure 1G:
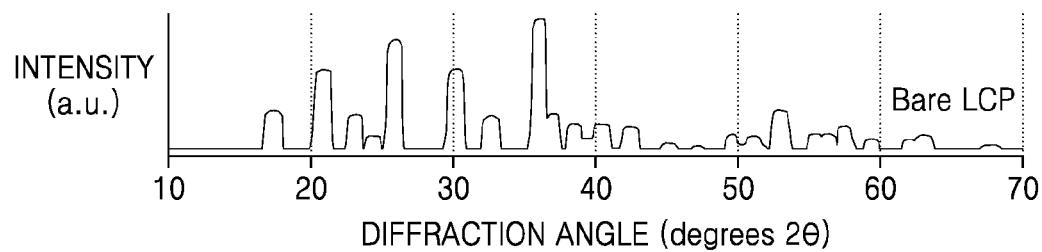
FIG. 1G is a graph of intensity (arbitrary units, a.u.) versus diffraction angle (degrees 2θ) showing results of X-ray diffraction analysis of a composite cathode active material of Comparative Preparation Example 1.
Figure 1H:
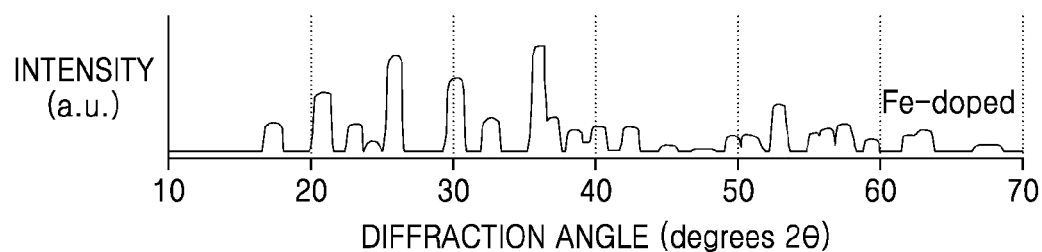
FIG. 1H is a graph of intensity (arbitrary units, a.u.) versus diffraction angle (degrees 2θ) showing results of X-ray diffraction analysis of a composite cathode active material of Comparative Preparation Example 2.
Figure 1I:
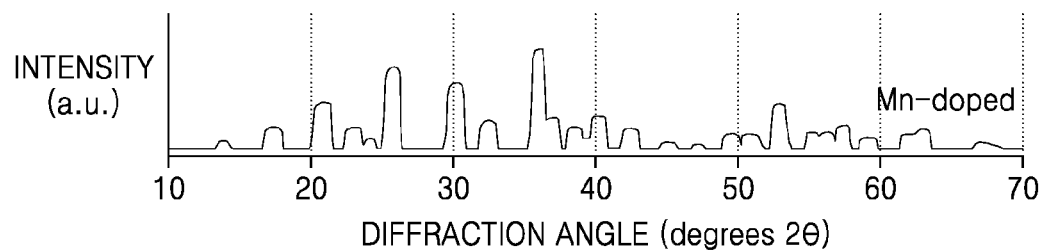
FIG. 1I is a graph of intensity (arbitrary units, a.u.) versus diffraction angle (degrees 2θ) showing results of X-ray diffraction analysis of a composite cathode active material of Comparative Preparation Example 3.

As shown in FIGS. 1A to 1F, it may be known that the composite cathode active materials prepared in Preparation Examples 1 to 6 had a crystal structure that belongs to an orthorhombic crystal system and a Pnma space group. Also, as shown in FIGS. 1G to 1I, the cathode active material of Comparative Preparation Example 1 and the composite cathode active materials of Comparative Preparation Examples 2 and 3 having a composition of $LiCoPO_4$ had a crystal structure that belongs to an orthorhombic crystal system and a Pnma space group.

The unit-cell volumes were evaluated using a Rietveld refinement method of the XRD analysis of the cathode active materials prepared in Preparation Examples 1 to 19 and Comparative Preparation Examples 1 to 6, and the charge/discharge average voltages thereof were evaluated.

The results of the evaluation are shown in FIG. 2 and Table 2. In FIG. 2, a voltage of the y-axis denotes a charge/discharge average voltage.

TABLE 2

| Sample | Composition | Unit-cell volume (Å³) |
|---|---|---|
| Preparation Example 1 | $LiCo_{0.9}Ti_{0.1}PO_4$ | 284.0 |
| Preparation Example 2 | $LiCo_{0.9}Cr_{0.1}PO_4$ | 284.3 |
| Preparation Example 3 | $LiCo_{0.9}V_{0.1}PO_4$ | 283.9 |
| Preparation Example 4 | $LiCo_{0.9}Zn_{0.1}PO_4$ | 284.1 |
| Preparation Example 5 | $LiCo_{0.9}Cu_{0.1}PO_4$ | 284.2 |
| Preparation Example 6 | $LiCo_{0.9}Sc_{0.1}PO_4$ | 284.6 |
| Preparation Example 7 | $LiCo_{0.9}Zn_{0.05}Ni_{0.05}PO_4$ | 283.8 |
| Preparation Example 8 | $LiCo_{0.9}Zn_{0.05}Fe_{0.05}PO_4$ | 284.5 |
| Preparation Example 9 | $LiCo_{0.9}Zn_{0.05}V_{0.05}PO_4$ | 284.0 |
| Preparation Example 10 | $LiCo_{0.9}Ni_{0.05}V_{0.05}PO_4$ | 283.5 |
| Preparation Example 11 | $LiCo_{0.9}Ti_{0.05}Zn_{0.05}PO_4$ | 284.1 |
| Preparation Example 12 | $LiCo_{0.9}Ni_{0.05}Fe_{0.05}PO_4$ | 284.3 |
| Preparation Example 13 | $LiCo_{0.9}V_{0.05}Fe_{0.05}PO_4$ | 284.3 |
| Preparation Example 14 | $LiCo_{0.9}Ti_{0.05}Fe_{0.05}PO_4$ | 284.5 |
| Preparation Example 15 | $LiCo_{0.9}Ti_{0.05}V_{0.05}PO_4$ | 284.1 |
| Preparation Example 16 | $LiCo_{0.95}Ti_{0.05}PO_4$ | 284.1 |
| Preparation Example 17 | $LiCo_{0.8}Ti_{0.2}PO_4$ | 283.8 |
| Preparation Example 18 | $LiCo_{0.95}V_{0.05}PO_4$ | 284.0 |
| Preparation Example 19 | $LiCo_{0.8}V_{0.2}PO_4$ | 284.1 |
| Comparative Preparation Example 1 | $LiCoPO_4$ | 284.1 |
| Comparative Preparation Example | $LiCo_{0.9}Fe_{0.1}PO_4$ | 285.0 |

TABLE 2-continued

| Sample | Composition | Unit-cell volume (Å³) |
|---|---|---|
| Example 2 | | |
| Comparative Preparation Example 3 | $LiCo_{0.9}Mn_{0.1}PO_4$ | 285.9 |
| Comparative Preparation Example 4 | $LiCo_{0.9}Ni_{0.1}PO_4$ | 283.8 |
| Comparative Preparation Example 5 | $LiCo_{0.95}Fe_{0.05}PO_4$ | 284.7 |
| Comparative Preparation Example 6 | $LiCo_{0.8}Fe_{0.2}PO_4$ | 285.4 |

As shown in Table 2 and FIG. 2, the composite cathode active materials of Preparation Examples 1 to 19 had unit-cell volumes smaller than those of the composite cathode active materials of Comparative Preparation Examples 2, 3, 5, and 6 and similar to those of the cathode active materials of Comparative Preparation Examples 1 and 4.

In particular, as shown in FIG. 2, unit-cell volumes of the (titanium-doped) composite cathode active material of Example 1, the (chromium-doped) composite cathode active material of Example 2, the (vanadium-doped) composite cathode active material of Example 3, and the (copper-doped) composite cathode active material of Example 5 were smaller than those of the (iron-doped) cathode active material of Comparative Example 2 and the (Mn-doped) cathode active material of Comparative Example 3 despite including titanium, vanadium, and copper having large ion sizes. Since unit-cell volumes of the composite cathode active materials of Preparation Examples 1 to 15 were small, charge/discharge average voltages were increased as compared to those of the composite cathode active materials of Comparative Preparation Examples 2 and 3, and thus the composite cathode active materials of Preparation Examples 1 to 15 had excellent high-voltage characteristics.

Figure 2A:
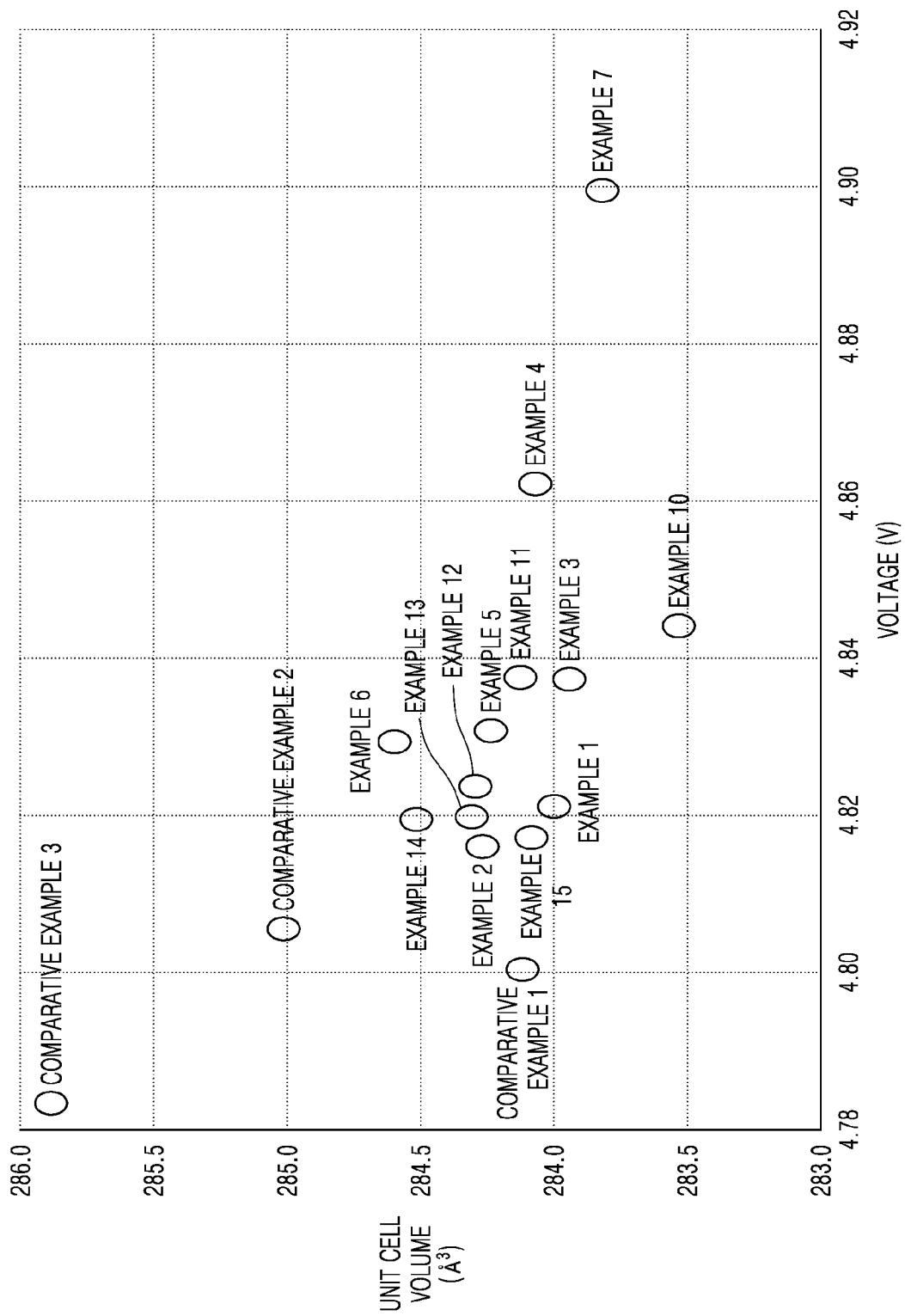
FIG. 2A is a graph of unit cell volume (cubic angstroms, $Å^3$) versus charge/discharge average voltage (volts (V) versus Li/Li+) illustrating unit-cell volumes of composite cathode active materials used in lithium secondary batteries of Examples 1 to 5 and Comparative Examples 1 to 3 and charge/discharge average voltages of the lithium secondary batteries.

The charge/discharge average voltages in FIG. 2A were obtained as follows. After obtaining a charge/discharge curve by charging the lithium secondary batteries prepared in Examples 1 to 19 and Comparative Examples 1 to 6 at a constant current of 0.5 C until a voltage was 5.2 V (vs. Li) and discharging the batteries until a voltage was 4.0 V (vs. Li), the curve was converted into a graph having differential values (dQ/dV) which are derivatives of the charge (Q) with respect to the voltage (V) on the y-axis and the voltages (V) on the x-axis. Subsequently, average values of the charge voltages and discharge voltages determined by the x-values at which the values of y-axis become the maximum were obtained. Such voltage deriving method is referred to as a differential capacity analysis (DCA), which is used to obtain electrochemical reaction voltages of given materials.

Evaluation Example 2: Discharge Voltage (1) Examples 1 to 15 and Comparative Examples 1 to 3

The lithium secondary batteries prepared in Examples 1 to 15 and Comparative Examples 1 to 3 were charged at a constant current of 0.5 C at 25° C. until a voltage was 5.2 V (vs. Li).

Subsequently, the batteries were each discharged at a constant current of 0.5 C until a voltage was 4.0 V (vs. Li).

Figure 2B:
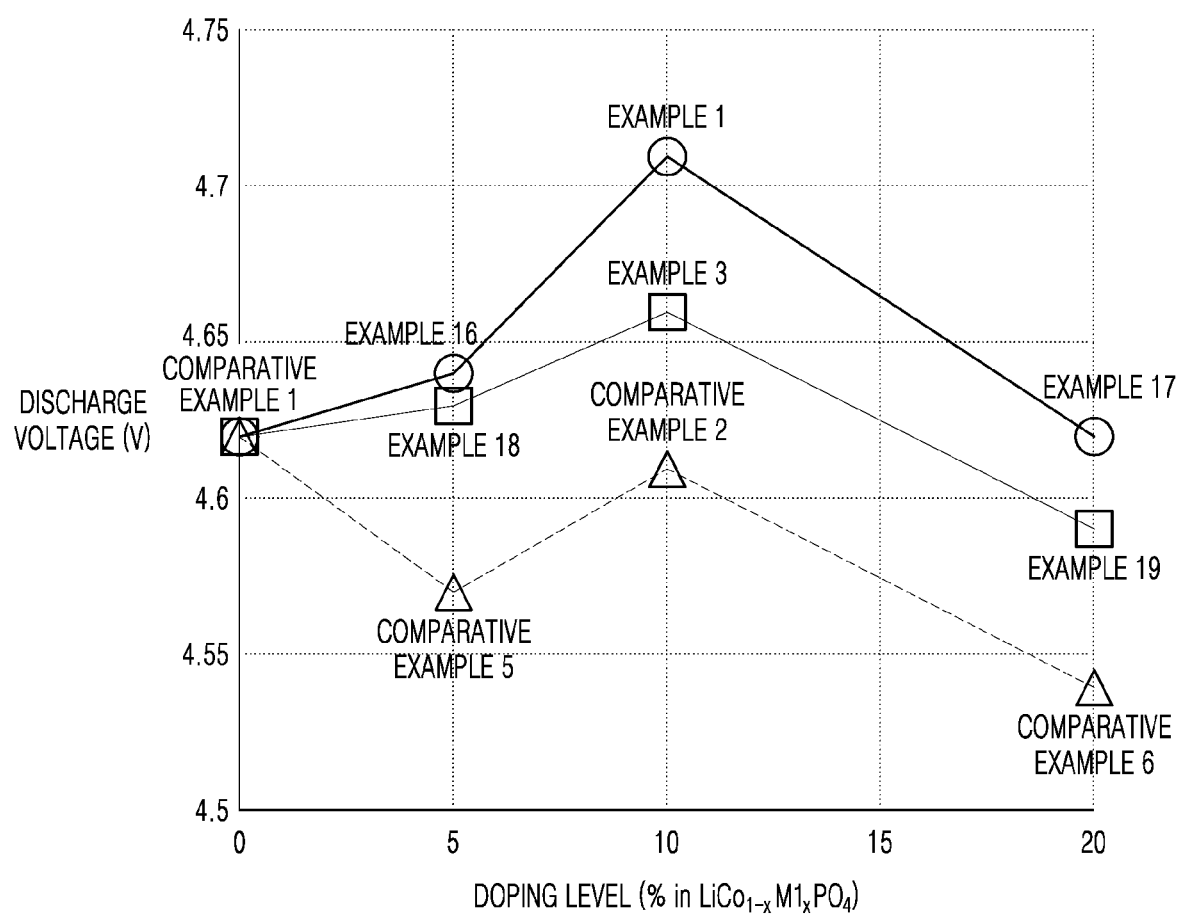
FIG. 2B is a graph of average discharge voltage (volts, V) versus doping level (percent in $LiCo_{1-x}M1_xPO_4$) illustrating charge/discharge average voltages of lithium secondary batteries of Examples 1, 3, and 17 to 19 and Comparative Examples 1, 2, 5, and 6.

The results of the charge/discharge test are shown in FIG. 2B and Table 3. Discharge voltages in FIG. 2B and Table 3 are average discharge voltages.

TABLE 3

| Sample | Discharge voltage [V vs. Li] |
|---|---|
| Example 1 | 4.82 |
| Example 2 | 4.82 |
| Example 3 | 4.84 |
| Example 4 | 4.86 |
| Example 5 | 4.83 |
| Example 6 | 4.83 |
| Example 7 | 4.90 |
| Example 8 | 4.88 |
| Example 9 | 4.85 |
| Example 10 | 4.84 |
| Example 11 | 4.84 |
| Example 12 | 4.82 |
| Example 13 | 4.82 |
| Example 14 | 4.82 |
| Example 15 | 4.82 |
| Comparative Example 1 | 4.80 |
| Comparative Example 2 | 4.81 |
| Comparative Example 3 | 4.78 |

As shown in FIG. 2B and Table 3, the discharge voltages of the lithium batteries of Examples 1 to 15 were improved as compared to those of the lithium batteries of Comparative Examples 1 to 3.

Evaluation Example 3: Overcharge (1) Examples 1 and 3 and Comparative Examples 1 to 4

The lithium secondary batteries prepared in Examples 1 to 3 and Comparative Examples 1 to 4 were each charged at a constant current of 0.1 C at 25° C. until a voltage was 5.2 V (vs. Li).

Then, the batteries were each discharged at a constant current of 0.1 C until a voltage was 4.0 V (vs. Li).

Figure 4:
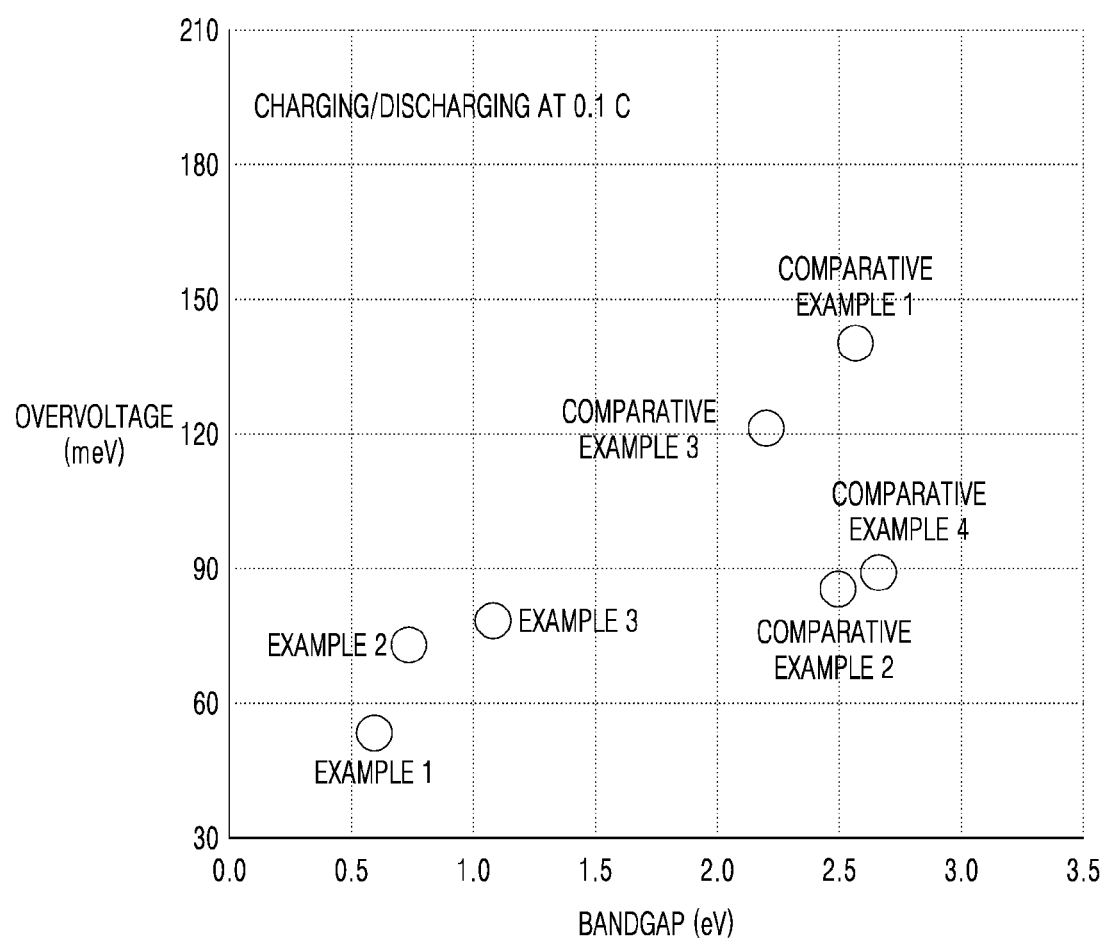
FIG. 4 is a graph of overvoltage (millielectronvolts, meV) versus bandgap (electronvolts, eV) showing overvoltage change according to a band gap of the composite cathode active material during charging/discharging at 0.1 C in the lithium secondary batteries of Examples 1 to 3 and 5 and Comparative Examples 1 to 4.
Figure 5:
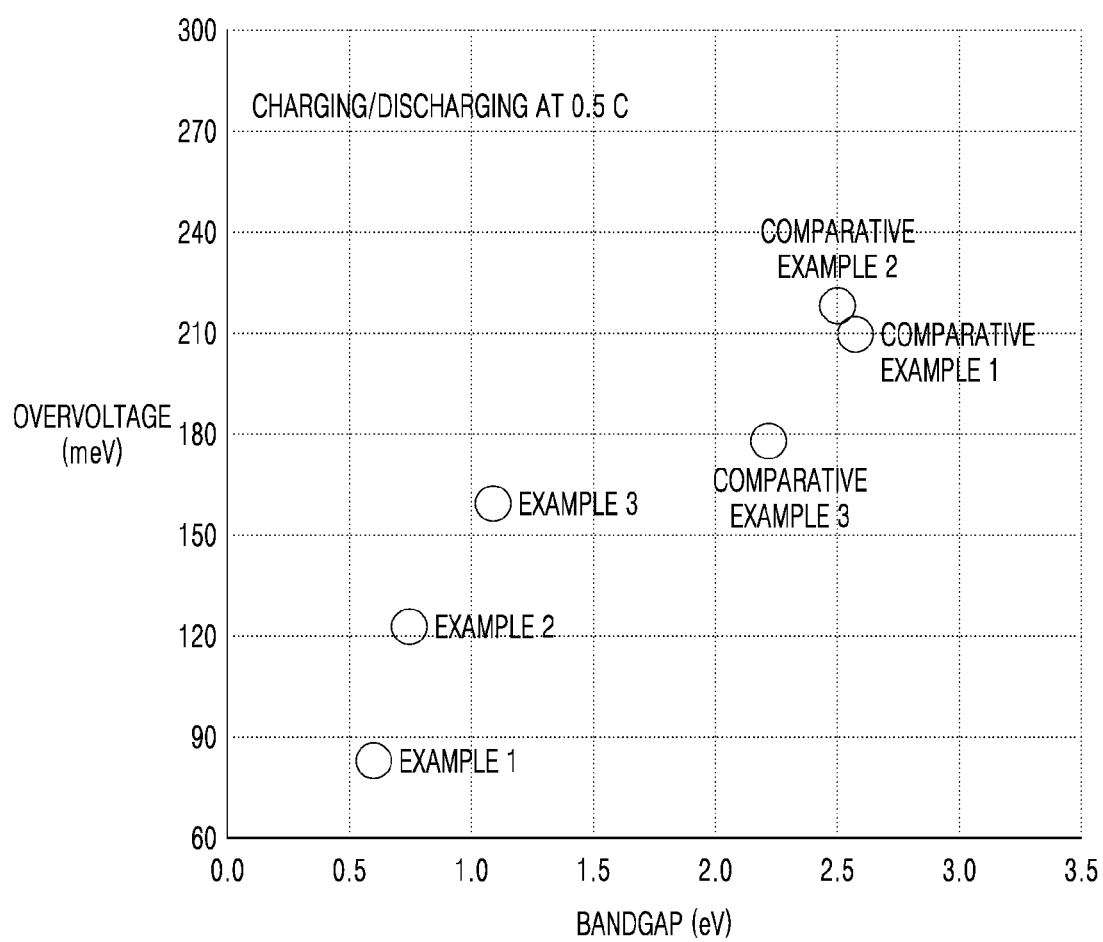
FIG. 5 is a graph of overvoltage (millielectronvolts, meV) versus bandgap (electronvolts, eV) showing overvoltage change according to a band gap of the composite cathode active material during charging/discharging at 0.5 C in the lithium secondary batteries of Examples 1, 2, 3, and 6 and 5 and Comparative Examples 1 to 4.

Overvoltage characteristics in the first charging/discharging cycle are shown in FIG. 4. Also, overvoltage characteristics of the batteries evaluated in the same manner, except that the charging/discharging was performed at 0.5 C instead of charging/discharging at 0.1 C, are shown in FIG. 5. In FIGS. 4 and 5, band gaps were obtained using a quantum computing method. The quantum calculation was based on a density functional theory (DFT).

As shown in FIG. 4 of 0.1 C charging/discharging, band gaps of the composite cathode active materials of Examples 1 to 3 were less than band gaps of the cathode active materials used in Comparative Examples 1 to 4, and thus the electron conductivity of the composite cathode active materials of Examples 1 to 3 were improved. In this regard, the lithium secondary batteries of Examples 1 to 3 had reduced overvoltages as compared to those of the lithium secondary batteries of Comparative Examples 1 to 4.

As shown in FIG. 5 of 0.5 C charging/discharging, the lithium secondary batteries of Examples 1 to 3 had improved overvoltage characteristics at 0.5 C charging/discharging as compared to those of the lithium secondary batteries of Comparative Examples 1 to 3.

(2) Examples 9 to 15 and Comparative Example 1

The lithium secondary batteries prepared in Examples 9 to 15 mad Comparative Example 1 were charged at a constant current of 0.1 C at 25° C. until a voltage was 5.2 V (vs. Li).

Subsequently, in discharging, the batteries were each discharged at a constant current of 0.5 C until the voltage was 4.0 V (vs. Li).

Overvoltage characteristics of the initial charging/discharging process are shown in Table 4.

TABLE 4

| Sample | Overpotential@0.5C (mV) |
|---|---|
| Example 9 | 100.8 |
| Example 10 | 68.6 |
| Example 11 | 71.6 |
| Example 12 | 80.0 |
| Example 13 | 58.2 |
| Example 14 | 77.6 |
| Example 15 | 57.6 |
| Comparative Example 1 | 107.5 |

As shown in Table 4, the lithium batteries of Examples 9 to 15 had improved overvoltage characteristics as compared to those of the lithium battery of Comparative Example 1.

As shown in FIG. 5 of 0.5 C charging/discharging, the lithium secondary batteries of Examples 1 to 3 had improved overvoltage characteristics at 0.5 C charging/discharging as compared to those of the lithium secondary batteries of Comparative Examples 1 to 3.

Evaluation Example 4: Battery Lifespan Characteristics

The lithium batteries prepared in Examples 1, 3, and 4 and Comparative Examples 1 and 3 were charged at a constant current of 0.1 C at 25° C. until a voltage was 5.2 V (vs. Li), and then discharged at a constant current of 0.1 C until a voltage was 4.0 V (vs. Li) ($1^{st}$ cycle).

Figure 3:
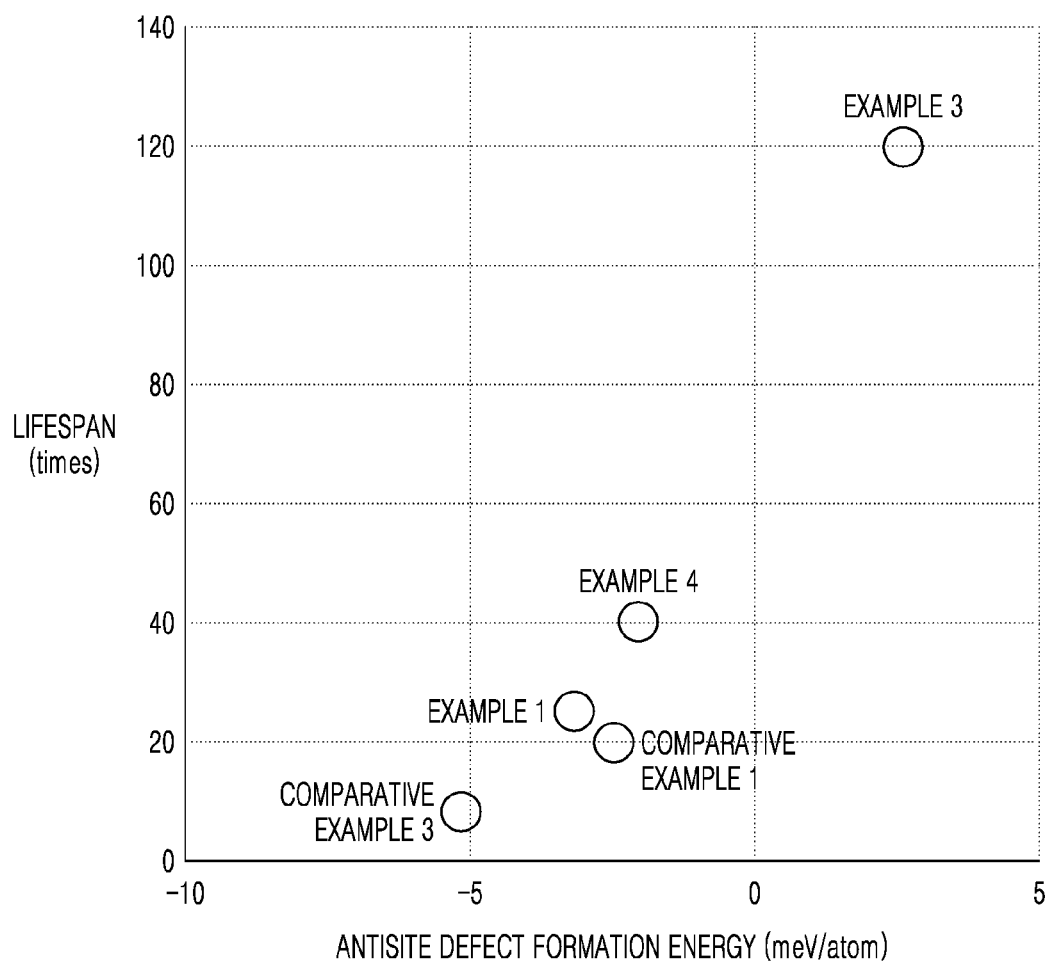
FIG. 3 is a graph of lifespan (times) versus antisite defect formation energy (millielectrovolts, meV) showing lifespan characteristics change in each of lithium secondary batteries with respect to antisite defect formation energy of the composite cathode active materials used in the lithium secondary batteries of Examples 1, 3, and 4 and Comparative Examples 1 and 3.

The battery lifespan characteristics were evaluated by counting the number of charging/discharging that shows 80% discharge capacity compared to the initial discharge capacity, and the results are shown in FIG. 3.

Lifespan characteristic change with respect to the antisite defect formation energy of the composite cathode active materials in the lithium secondary batteries of Example 1 (Ti), Example 3 (V), Example 4 (Zn), Comparative Example 1, and Comparative Example 3 (Mn) are shown in FIG. 3.

Referring to FIG. 3, the Li—Co antisite defect formation energy was analyzed using a quantum computing method, and it may be known that when the composite cathode active material is doped with vanadium, zinc, and titanium, particularly when doped with vanadium, antisite mixing suppression ability exhibited by the composite cathode active material was excellent, and thus the lifespan of the batteries were improved. The lithium secondary batteries of Examples 1, 3, and 4 including cathodes containing the composite cathode active materials including these doping elements had improved lifespan characteristics than those of the lithium batteries of Comparative Examples 1 and 3.

Evaluation Example 5: High-Rate Characteristics

The lithium batteries prepared in Examples 1, 2, 3, and 6 and Comparative Example 1 were charged at a constant current of 0.1 C at 25° C. until a voltage was 5.2 V (vs. Li), and then discharged at a constant current of 0.1 C until a voltage was 4.0 V (vs. Li).

Also, the lithium batteries prepared in Examples 1, 2, 3, and 6 and Comparative Example 1 were charged at a constant current of 0.5 C until a voltage was 5.2 V (vs. Li) and discharged until a voltage was 4.0 V (vs. Li).

The results of the charging/discharging test are shown in Table 5. The high-rate characteristics are the same as defined in Equation 1.

Equation 1

High-rate characteristics [%]=[Discharge capacity in the 1stcycle (0.5C rate)/discharge capacity in the 1stcycle (0.1C rate)]×100

TABLE 5

| Sample | High-rate characteristics [%] |
|---|---|
| Comparative Example 1 | 84 |
| Example 1 | 99 |
| Example 2 | 84 |
| Example 3 | 85 |
| Example 6 | 90 |

As shown in Table 5, the lithium secondary batteries of Examples 1 to 3 and 6 had improved high-rate characteristics as compared to those of the lithium secondary battery of Comparative Example 1.

As described above, according to one or more embodiments, a composite cathode active material has high-voltage characteristics, reduced charge/discharge overvoltage, and improved discharge capacity. When a secondary battery includes a cathode including the composite cathode active material, the lifespan characteristics, high-rate characteristics, and energy density of the secondary battery may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A composite cathode active material represented by at least one of $LiCo_{0.9}Ti_{0.1}PO_4$, $LiCo_{0.8}Ti_{0.2}PO_4$, $LiCo_{0.7}Ti_{0.3}PO_4$, $LiCo_{0.9}V_{0.1}PO_4$, $LiCo_{0.8}V_{0.2}PO_4$, $LiCo_{0.7}V_{0.3}PO_4$, $LiCo_{0.9}Zn_{0.1}PO_4$, $LiCo_{0.8}Zn_{0.2}PO_4$, $LiCo_{0.7}Zn_{0.3}PO_4$, $LiCo_{0.9}Cu_{0.1}PO_4$, $LiCo_{0.8}Cu_{0.2}PO_4$, $LiCo_{0.7}Cu_{0.3}PO_4$, $LiCo_{0.9}Sc_{0.1}PO_4$, $LiCo_{0.8}Sc_{0.2}PO_4$, $LiCo_{0.7}Sc_{0.3}PO_4$, $LiCo_{0.9}Zn_{0.05}Ni_{0.05}PO_4$, $LiCo_{0.8}Zn_{0.1}Ni_{0.1}PO_4$, $LiCo_{0.7}Zn_{0.15}Ni_{0.15}PO_4$,
$LiCo_{0.9}Zn_{0.05}V_{0.05}PO_4$, $LiCo_{0.8}Zn_{0.1}V_{0.1}PO_4$, $LiCo_{0.9}Zn_{0.15}V_{0.15}PO_4$, $LiCo_{0.9}Ni_{0.05}V_{0.05}PO_4$, $LiCo_{0.8}Ni_{0.1}V_{0.1}PO_4$, $LiCo_{0.7}Ni_{0.15}V_{0.15}PO_4$, $LiCo_{0.9}Ti_{0.05}Zn_{0.05}PO_4$, $LiCo_{0.8}Ti_{0.1}Zn_{0.1}PO_4$, $LiCo_{0.7}Ti_{0.15}Zn_{0.15}PO_4$,
$LiCo_{0.9}Ti_{0.05}V_{0.05}PO_4$, $LiCo_{0.8}Ti_{0.1}V_{0.1}PO_4$, or $LiCo_{0.7}Ti_{0.15}V_{0.15}PO_4$.

2. The composite cathode active material of claim 1, wherein the composite cathode active material has a crystal structure that belongs to an orthorhombic crystal system.

3. The composite cathode active material of claim 1, wherein the composite cathode active material has a crystal structure that belongs to a Pnma space group.

4. The composite cathode active material of claim 1, wherein an average discharge voltage of the composite cathode active material is about 4.4 volts to about 5.6 volts versus $Li/Li^+$.

5. The composite cathode active material of claim 1, wherein a specific capacity of the composite cathode active material at room temperature is about 50 milliampere hours per gram to about 170 milliampere hours per gram.

6. The composite cathode active material of claim 1,
wherein a band gap of the composite cathode active material is in a range of about 0.01 electronvolt to about 2.2 electronvolts, and
wherein an antisite defect formation energy is in a range of about −20 electronvolts to about 3 electronvolts.

7. The composite cathode active material of claim 1,
further comprising a carbonaceous coating layer disposed on a surface of the composite cathode active material.

8. A cathode comprising:
a cathode current collector; and
a cathode active material layer on a surface of the cathode current collector, the cathode active material layer comprising the composite cathode active material of claim 1.

9. A secondary battery comprising:
a cathode;
an anode; and
an electrolyte disposed between the cathode and the anode,
wherein the cathode comprises the composite cathode active material of claim 1.

10. The secondary battery of claim 9,
wherein the secondary battery is a multi-layer-ceramic battery comprising:
a plurality of cathode layers, at least one of the plurality of the cathode layers comprising the composite cathode active material;
a plurality of anode layers alternatively disposed between the plurality of cathode layers; and
a plurality of solid electrolyte layers alternatively disposed between and separating cathode layers and anode layers of the plurality of cathode layers and the plurality of anode layers.

11. The secondary battery of claim 10,
wherein a solid electrolyte in the solid electrolyte layers is an oxide solid electrolyte, and one of the plurality of anode layers comprise at least one anode active material of a lithium phosphate, lithium oxide, or a metal oxide.

12. A method of preparing a composite cathode active material, the method comprising:
mixing a M1 precursor, a lithium precursor, a cobalt precursor, and a phosphorus precursor to prepare a precursor mixture,
wherein M1 is at least one of Sc, Ti, V, Cu, Ni, or Zn; and
heat-treating the precursor mixture to form a composite cathode active material of claim 1.

13. The method of claim 12,
wherein the heat-treating the precursor mixture comprises heat-treating in an oxidizing atmosphere or an inert atmosphere at a temperature in a range of about 600° C. to about 900° C.

14. A method of manufacturing a battery, the method comprising:
providing a cathode layer, a solid electrolyte, and an anode layer;
disposing the solid electrolyte layer between the cathode layer and the anode layer to prepare an assembly; and
pressing the assembly thus manufacturing the battery,
wherein the cathode layer comprises the composite cathode active material of claim 1.

* * * * *